United States Patent [19]

Algrain

[11] Patent Number: 5,124,938
[45] Date of Patent: Jun. 23, 1992

[54] GYROLESS PLATFORM STABILIZATION TECHNIQUES

[75] Inventor: Marcelo C. Algrain, Barrington, Ill.

[73] Assignee: Recon/Optical, Inc., Barrington, Ill.

[21] Appl. No.: 557,401

[22] Filed: Jul. 23, 1990

[51] Int. Cl.$^5$ .................. F16F 15/00; B64C 17/00
[52] U.S. Cl. .................... 364/566; 364/174; 364/559; 248/550; 318/649
[58] Field of Search .......... 364/453, 174, 559, 566; 318/649; 352/243; 248/550; 354/70, 81, 293

[56] References Cited

U.S. PATENT DOCUMENTS

| | | | |
|---|---|---|---|
| 3,398,341 | 8/1968 | Dooley et al. | 318/649 |
| 3,638,502 | 2/1972 | Leavitt et al. | 73/115.34 |
| 3,703,999 | 11/1972 | Forys et al. | 354/70 X |
| 3,936,716 | 2/1976 | Bos | 318/591 |
| 3,986,092 | 10/1976 | Tijsma et al. | 318/649 |
| 4,033,541 | 7/1977 | Malueg | 248/550 |
| 4,052,654 | 10/1977 | Kramer et al. | 318/649 |
| 4,152,729 | 5/1979 | Hobbs et al. | 358/222 |
| 4,217,606 | 8/1980 | Nordmann | 358/108 |
| 4,352,481 | 10/1982 | Forward | 248/550 |
| 4,437,047 | 3/1984 | Smay | 318/649 X |
| 4,458,554 | 7/1984 | Hrastar | 73/573 R |
| 4,483,425 | 11/1984 | Newman | 318/649 X |
| 4,680,521 | 7/1987 | Hofman | 318/649 |
| 4,710,819 | 12/1987 | Brown | 358/229 |
| 4,711,125 | 12/1987 | Morrison | 73/178 R |
| 4,725,843 | 2/1988 | Suzuki et al. | 364/434 X |
| 4,747,155 | 5/1988 | Dotson | 382/42 |
| 4,811,233 | 3/1989 | Lauro | 364/453 |
| 4,821,205 | 4/1989 | Schutter et al. | 364/508 |
| 4,873,526 | 10/1989 | Katsuo | 318/649 X |
| 4,989,466 | 2/1991 | Goodman | 352/243 X |
| 4,999,534 | 3/1991 | Andrianos | 318/649 X |

FOREIGN PATENT DOCUMENTS 904616 7/1972 Canada .

OTHER PUBLICATIONS

Ogata, Katsuhiko, "Modern Control Engineering", pp. 100–103 (1970).
Electro-craft Corporation, "DC Motors Speed Controls Servo Systems", an Engineering Handbook, pp. 2-16 to 2-21, 4-1 to 4-9, 4-21 to 4-27.
Shinners, Stanley, M., "Modern Control System Theory and Application", pp. 46-51.
Kayton, "Avionics Navigation Systems", pp. 281-310.
Arnold and Maunder, "Gyrodynamics and its Engineering Applications", pp. 394-405.
Schuler, et al., "Measuring Rotational Motion with Linear Accelerometers", Proceedings of the Twelfth East Coast Confernce on Aerospace and Navigational Electronics.
Krishnan, "Measurement of Angular Velocity and Linear Acceleration Using Linear Accelerometers", vol. 280, No. 4.

(List continued on next page.)

Primary Examiner—Parshotam S. Lall
Assistant Examiner—Thomas S. Auchterlonie
Attorney, Agent, or Firm—Allegretti & Witcoff, Ltd.

[57] ABSTRACT

A method and apparatus for platform stabilization. The apparatus uses linear and/or angular accelerometers to derive the roll, pitch, and yaw components of the angular velocity of the vehicle the apparatus is mounted on. Based on the calculation of angular velocity or acceleration of the vehicle and the current rate and angle of rotation of the device to be stabilized, the apparatus generates setpoint and movement commands for servo motors that rotate the sensing device such that the line of sight of the sensing device is stabilized. A control system implements a velocity control system, or, alternatively, an acceleration control system. In one embodiment of the invention, the accelerometers are positioned on a mounting base along axes corresponding to the roll, pitch and yaw axes of the vehicle in a location adjacent to the sensing device. In an alternative embodiment, the accelerometers are positioned on the stabilized element itself, with the command strategy being to force gimbal rotations so that the output of the accelerometers is urged towards a null value.

42 Claims, 10 Drawing Sheets

OTHER PUBLICATIONS

Hu, "Angular Acceleration Measurement Errors Induced by Linear Accelerometer Cross-Axis Coupling", Shock and Vibration Information Center The Shock and Vibration Bulletin, No. 50, part 2, pp. 11-16 (1980).

Lopatin, "Measurement of Absolute Angular Velocity of Aircrafts by Means of Linear Accelerometers", ITS IZV. Vuzov-Instr. Bldg., vol. 9, No. 6, pp. 118-124 (1967).

Hu, "Rotational Measurement Techniques Using Linear Accelerometers", Proceedings of the International Instrumentation Symposium, ISA, pp. 349-354.

Wolfe & Zeiss, editors, Infrared Handbook, S.P.I.E., pp. 22-3 to 22-37 (1985).

Pacific Aerosystems, Inc., AP 438 Brochure.

Versatron Corporation, Skyball Brochure.

CAI KS-146 B product description.

MOTION OF YAW GIMBAL WITH
RESPECT TO VEHICLE

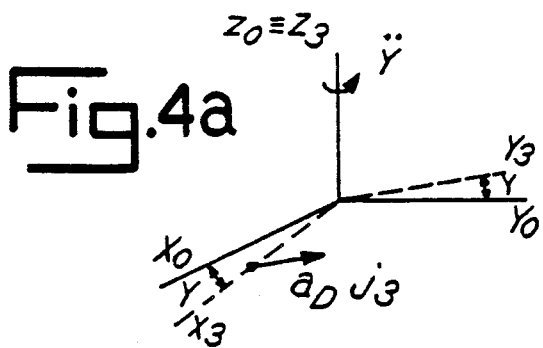

Fig.4a

$$\vec{I_3} = [T_Y] \vec{I_0}$$

$$\begin{Bmatrix} i_3 \\ j_3 \\ k_3 \end{Bmatrix} = \begin{bmatrix} \cos y & \sin y & 0 \\ \sin y & \cos y & 0 \\ 0 & 0 & 1 \end{bmatrix} \begin{Bmatrix} i_0 \\ j_0 \\ k_0 \end{Bmatrix}$$

$i_3 = \cos y\, i_0 + \sin y\, j_0$ $j_3 = -\sin y\, i_0 + \cos y\, j_0$ $\boxed{k_3 = k_0}$

MOTION OF PITCH GIMBAL
WITH RESPECT TO YAW
GIMBAL

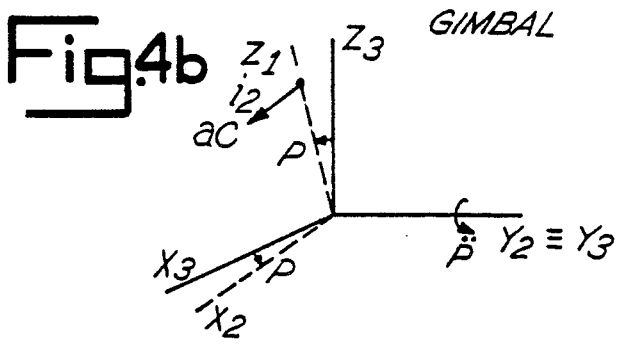

Fig.4b

$$\vec{I_2} = [T_P] \vec{I_3}$$

$$\begin{Bmatrix} i_2 \\ j_2 \\ k_2 \end{Bmatrix} = \begin{bmatrix} \cos P & 0 & -\sin P \\ 0 & 1 & 0 \\ \sin P & 0 & \cos P \end{bmatrix} \begin{Bmatrix} i_3 \\ j_3 \\ k_3 \end{Bmatrix}$$

$i_2 = \cos P\, i_3 - \sin P\, k_3$ $j_2 = j_3$ $k_2 = \sin P\, i_3 + \cos P\, k_3$

MOTION OF ROLL GIMBAL WITH
RESPECT TO PITCH GIMBAL

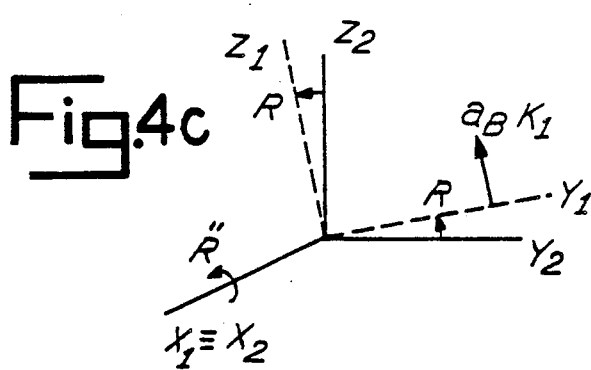

Fig.4c

$$\vec{I_1} = [T_R] \vec{I_2}$$

$$\begin{Bmatrix} i_1 \\ j_1 \\ k_1 \end{Bmatrix} = \begin{bmatrix} 1 & 0 & 0 \\ 0 & \cos R & \sin R \\ 0 & -\sin R & \cos R \end{bmatrix} \begin{Bmatrix} i_2 \\ j_2 \\ k_2 \end{Bmatrix}$$

$i_1 = i_2$ $j_1 = \cos R\, j_2 + \sin R\, k_2$ $k_1 = -\sin R\, j_2 + \cos R\, k_2$

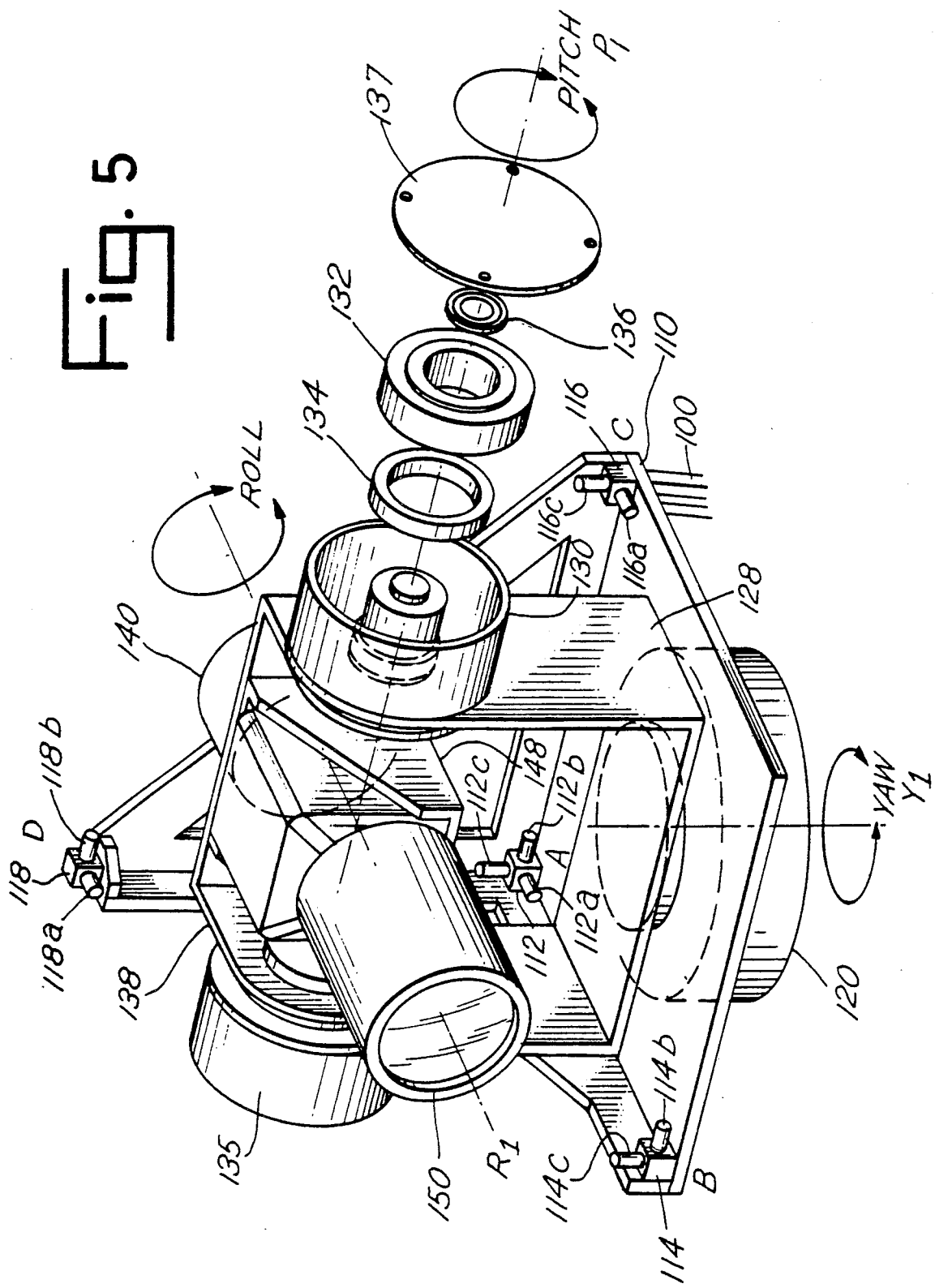

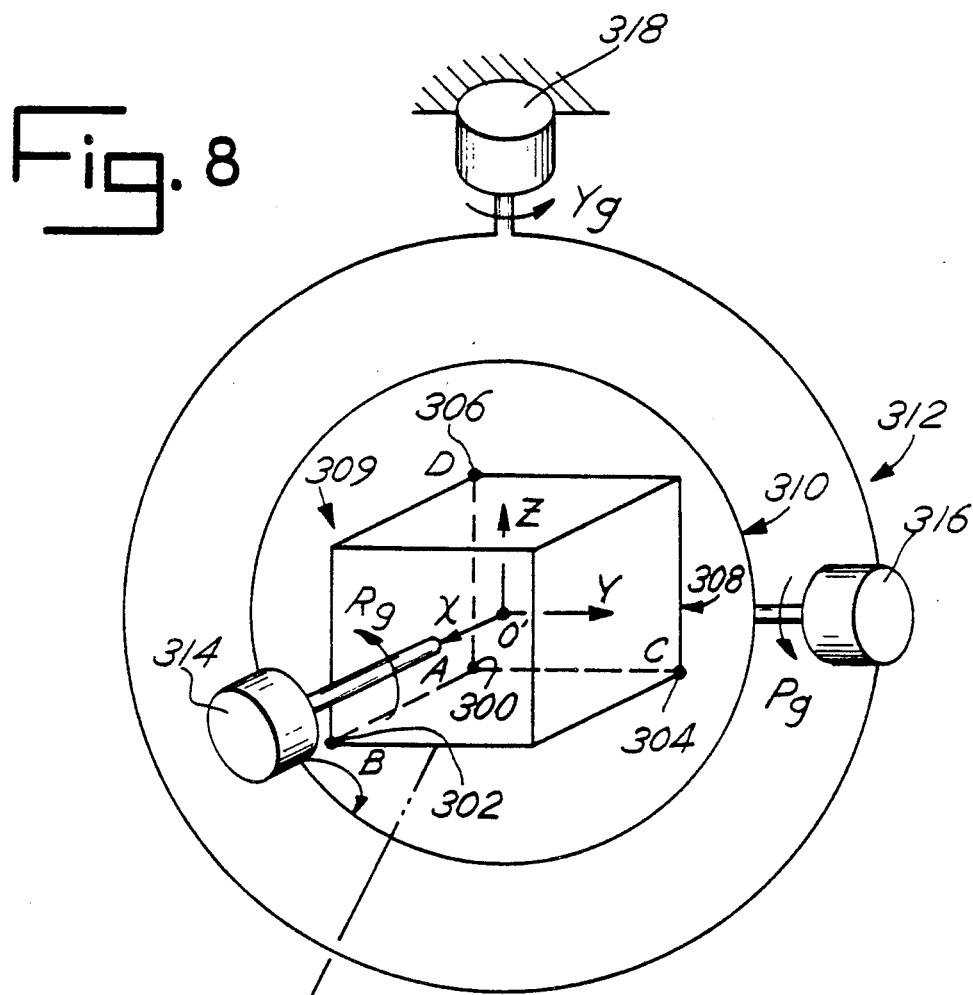
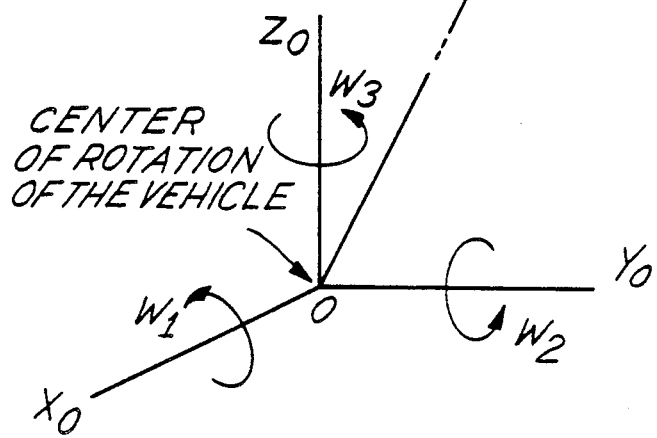
Fig. 8

GYROLESS PLATFORM STABILIZATION TECHNIQUES

BACKGROUND OF THE INVENTION

1. Field of the Invention

This invention relates generally to stabilization systems. More particularly, this invention relates to an accelerometer based stabilization apparatus that operates to stabilize an object such as a sensing or imaging device in a vehicle, such as an airplane, while the vehicle is subject to rotational and translational motion.

2. Description of Related Art

Sensing equipment, such as electronic imaging devices, cameras, radar, navigation instruments, and the like are frequently carried by and operated in a moving vehicle, such as an airplane, that undergoes rotational motions about its center of rotation. In such an environment, the equipment may be mounted on a movable platform that is stabilized with respect to movement of the vehicle. In some applications, such platforms are stabilized about only one axis. In other applications, the platforms are stabilized about two or three axes. These axes correspond to the roll, pitch, and yaw axes of the vehicle. Particular applications involve the stabilization of the line-of-sight of a camera or other imaging device. In this case, when the vehicle undergoes rotational motion about its axes, the line-of-sight remains fixed with respect to the inertial reference frame of the vehicle.

The prior art platform stabilization systems are based on the operation of the gyroscope. Typically mounted on gimbals, gyroscopes are used to absorb torques and provide inertial stiffness to the platform by exerting counter rotations on the gimbal. In other applications, gyroscopes are used in a control system where the tendency of the gyroscope to undergo precession is detected by a pickoff, which passes the signal to a motor that provides a compensating torque to the platform to stabilize it. See, *Avionics Navigation Systems*, Kayton, Fried Ed., p. 394 to 405.

Linear accelerometers are devices that measure bidirectional accelerations along an axis. It is known in the art that combinations of linear accelerometers, when arranged in various orientations, can be used to measure angular accelerations. See, e.g., A. S. Hu, *Rotational Measurement Technique Using Linear Accelerometers*, ISA (1977); V. I. Lopatin, *Measurement of Absolute Angular Velocity of Aircraft by Means of Linear Accelerometers* (1966). Alternatively, the angular accelerations of a body can be obtained at higher cost by angular accelerometers. Linear accelerometers have been used in inertial measurement units, such as the one described in U.S. Pat. No. 4,711,125, and in inertial navigation units. Linear accelerometers have been incorporated into stabilization systems that are founded upon the operation of the gyroscope. U.S. Pat. No. 3,936,716 discloses a 2 perpendicular axis stabilization platform stabilized by means of a gyro-controlled servo system mounted in a ship. In this patent, the linear accelerometers are used to hold a gyro in a vertical position, the linear accelerometers being sensitive to changes in speed and course of the ship.

Gyroscope based platform stabilization systems have numerous disadvantages, principally high cost and added weight. In some cases, the cost of gyroscopes and their associated equipment is the principal component to the overall cost of a stabilized platform.

Hence, an object of the invention is to provide gyroless platform stabilization techniques capable of stabilizing a sensing device or other object about one or more axes of rotation of the vehicle.

A further object of the invention is to provide platform stabilization techniques capable of scanning applications whereby the sensing device or object is not only stabilized but also scans according to externally supplied scanning criteria. Additionally, it is an object of the present invention to provide platform stabilization techniques capable of slewing operations whereby the sensing device of object is not only stabilized, but also slews to a desired orientation according to externally supplied commands.

A further object and advantage of the invention is that the stabilization apparatus is a light weight, low cost system, suitable for those applications where size and weight are significant restraints. The present invention has additional advantages in that it is a robust system and inherently more reliable than gyroscope systems, and generally has less power consumption.

A still further advantage of the invention is that it is based on accelerometers, which determine the angular acceleration of the stabilized platform mounting base (attached to the vehicle), or of the sensing device or object depending on the configuration used, and which also measure the cross product of the angular velocities and provide the necessary information for the computation of the statistics of the angular motions as a stochastic process. Accurate knowledge of such statistics is significant when optimal state estimators, such as Kalman Filters, are used to estimate the true value of the angular motion.

SUMMARY OF THE INVENTION

According to a preferred embodiment of the invention, these and other objectives and advantages are achieved by providing an apparatus for stabilizing an object carried by a vehicle with respect to an inertial frame of reference. The apparatus comprises, in combination, a means for moving the object relative to the vehicle and in opposition to the movement of the vehicle relative to the frame of reference in response to one or more movement signals, means for carrying the means for moving the object, means for generating one or more feedback signals in response to the movement of the object, and accelerometer means carried by the vehicle for measuring acceleration. The apparatus further comprises a control system means responsive to the feedback signals and to the accelerometer means for generating the movement signals. Each of the movement signals are responsive to both the feedback signals and the accelerometer means, whereby the object is stabilized without the use of gyroscopes as the vehicle undergoes movement relative to the frame of reference.

In the preferred embodiment of the invention, the control system is a closed loop type system, and means for measuring the current angle and rate of rotation are provided as inputs into the control system. The control system implements a velocity control strategy or, alternatively, an acceleration control strategy. The accelerometer means can be provided by angular accelerometers, or preferably, linear accelerometers. The means for moving the object, in the preferred embodiment of the invention, comprises a set of three servo motor driven gimbals responsive to the movement signals of the control system.

In an alternative embodiment of the invention, the means for measuring accelerations are placed directly on a stabilized element of the innermost gimbal and measure the object's accelerations. The control strategy is to force gimbal counterrotations so that the sensed angular accelerations are urged towards a nominal value, typically zero. The means for measuring accelerations may be angular accelerometers or, preferably, linear accelerometers.

BRIEF DESCRIPTION OF THE DRAWINGS

These and other objects, advantages, and features of the preferred and alternative embodiments of the invention can be understood with reference to the accompanying drawings in which like numbers refer to like parts throughout and in which:

FIGS. 4a, 4b and 4c are illustrations showing the relationship between unit vectors of the rotating frames shown in FIG. 3;

FIG. 5 is a partial cut away isometric drawing of a preferred form of stabilization apparatus made according to the present invention, with an exploded view of a motor, bearing and resolver assembly;

FIG. 8 is an isometric schematic diagram of an alternative embodiment of the present invention showing the accelerometers placed on a stabilized element of the platform holding a sensing device;

GENERAL OPERATION OF THE PREFERRED AND ALTERNATIVE EMBODIMENTS

Figure 1A:
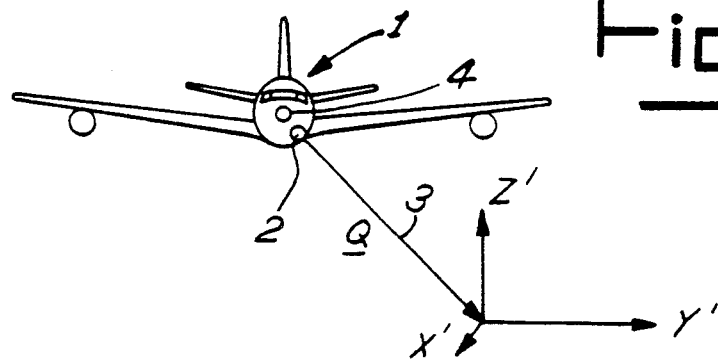
FIGS. 1a and 1b are schematic representations of an exemplary aircraft carrying a stabilized object defining a line of sight vector and a roll angle.
Figure 1B:
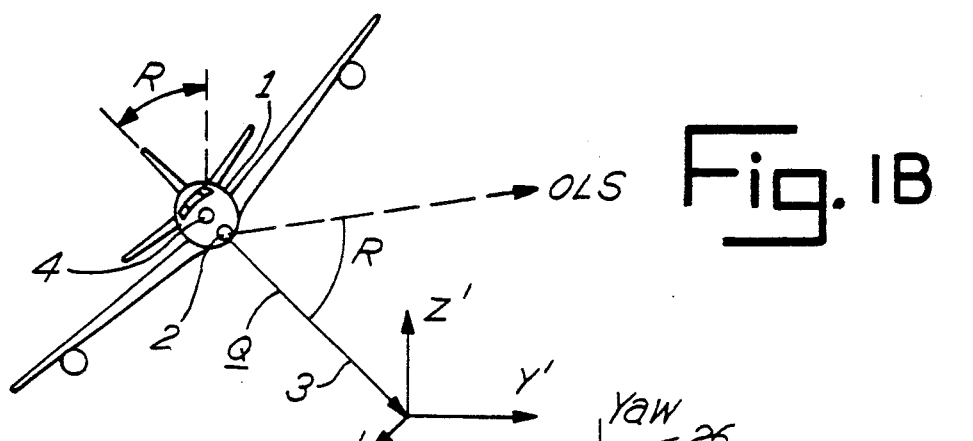

To assist in understanding the objective of the invention, FIG. 1a shows an airplane 1 in which is carried an imaging device, sensing device or other object 2. Object 2 maintains a line-of-sight vector 3 shown as vector $\underline{Q}$. Airplane 1 defines a roll axis 4 which lies along the length of the airplane and extends perpendicular to the surface of FIG. 1a. As airplane 1 flies, it may rotate around roll axis 4 through angle R which, at a later time, results in the airplane being in the position shown in FIG. 1b. The preferred embodiment, through measurement of linear and/or angular accelerations and calculation of set point commands and movement signals, rotates object 2 through angle R so that line-of-sight vector 3 remains in the same orientation and thereby stabilizes the sensing device with respect to a fixed inertial frame indicated by orthogonal axes x', y', and z'. The original line of sight which would have been maintained if object 2 had not been rotated is shown by dotted line OLS in FIG. 1b. FIGS. 1a and 1b show how the system operates in a one axis stabilization application, but the invention is capable of stabilization about two axes, or three axes (roll, pitch, and yaw axes) simultaneously.

Figure 2:
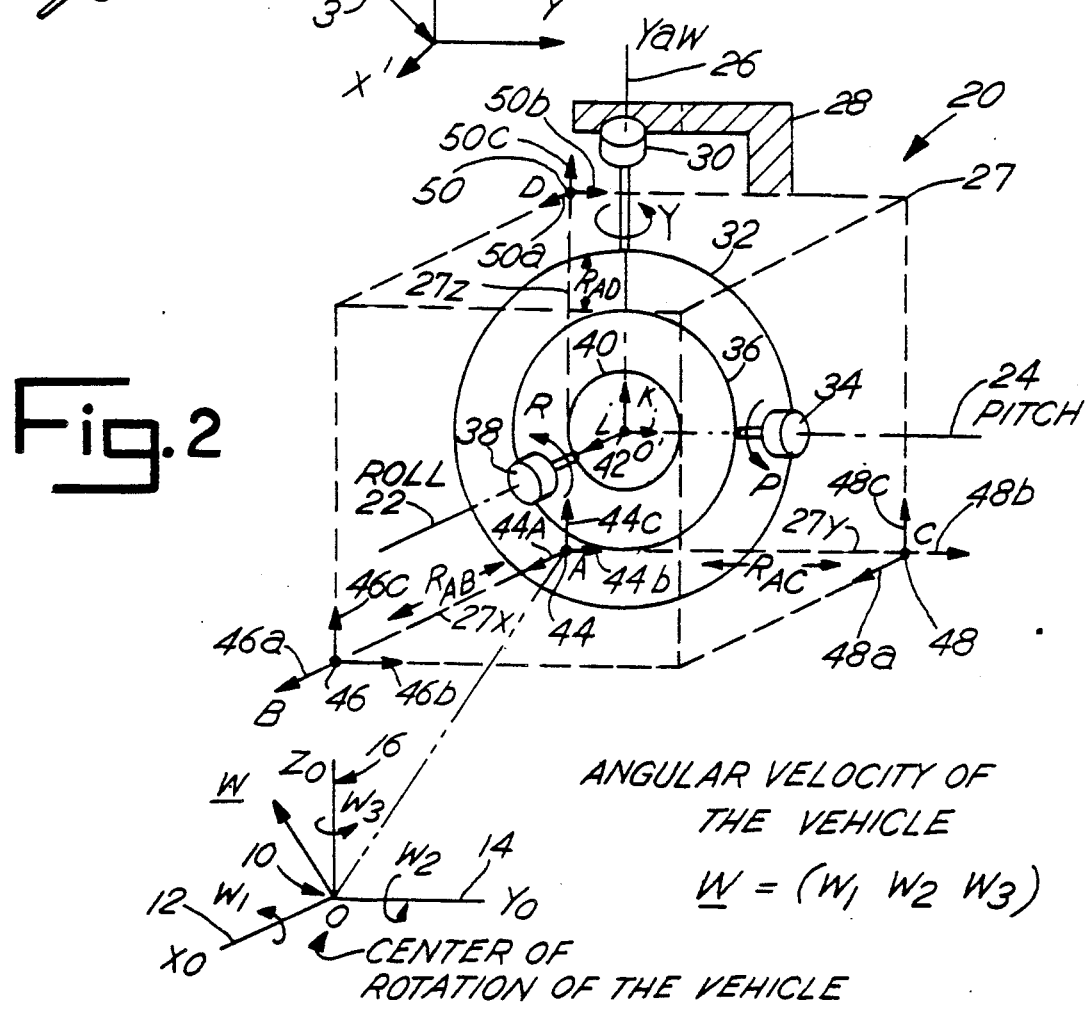
FIG. 2 is an isometric schematic diagram of a preferred embodiment of a stabilization system carried by a vehicle and defining rotating frames and employing rotating gimbals according to the present invention.
Figure 3:
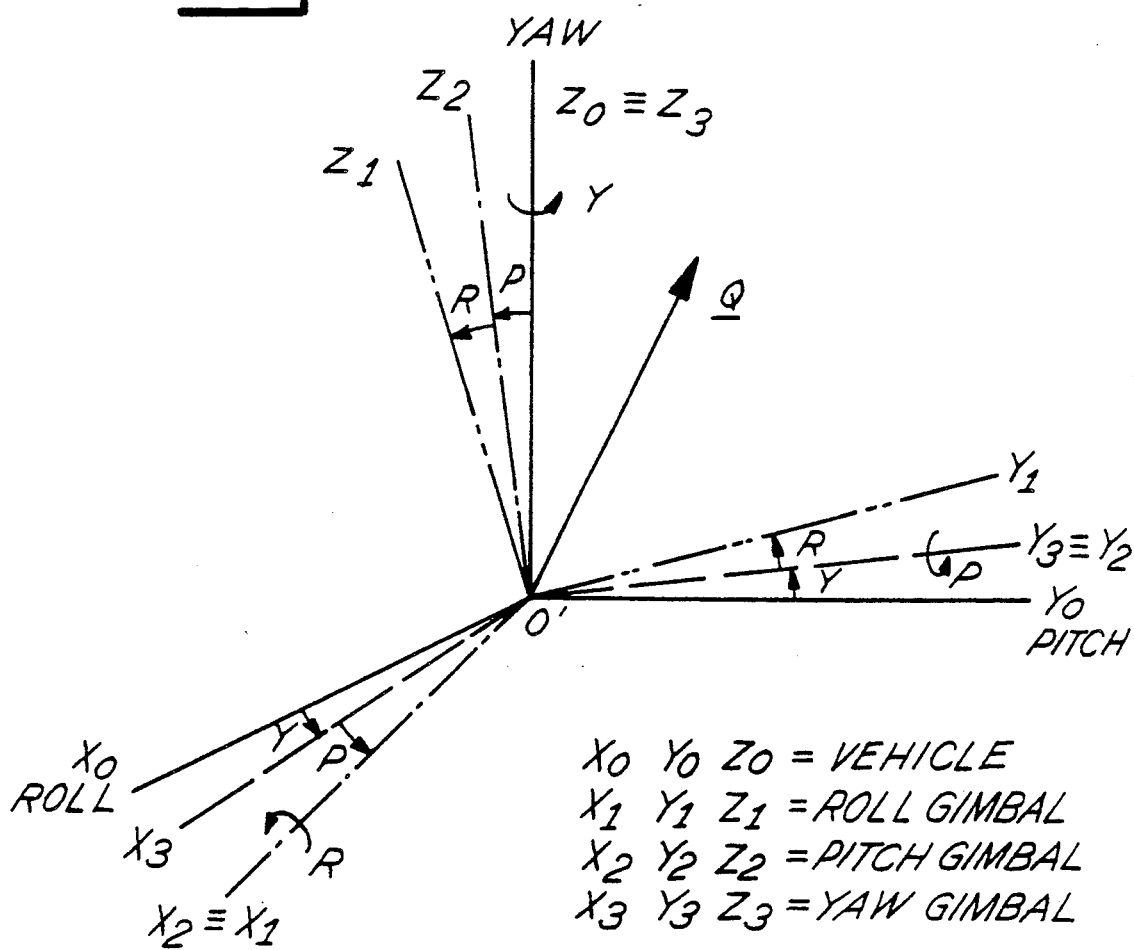
FIG. 3 is a generalized illustration showing the relation between all of the rotating frames shown in FIG. 2.

Referring to the generalized schematic diagram of FIG. 2 for a three axis stabilization application, an accelerometer based platform stabilization apparatus 20 is positioned at an arbitrary location with respect to a center of rotation 10 of a moving vehicle, such as an airplane, having a body 28. The vehicle's geometry defines three mutually orthogonal principal axes of the vehicle: a roll axis 12, a pitch axis 14, and a yaw axis 16 which also define a conventional orthogonal cartesian coordinate system with axes $x_o$, $y_o$ and $z_o$ and center of rotation O. As shown in FIG. 2, points 10 and O are coincident, and axes 12, 14 and 16 are colinear with axes $x_o$, $y_o$ and $z_o$, respectively. As shown in FIGS. 2 and 3, axes $x_o$, $y_o$ and $z_o$ also correspond to a vehicle frame. As shown in FIG. 2, the angular velocity of the vehicle $\underline{W}$ can be resolved into roll, pitch and yaw components, shown as $W_1$, $W_2$, $W_3$, respectively.

The accelerometer based platform stabilization apparatus 20 is oriented in a preferred orientation about three axes corresponding to the vehicle's roll axis 12, pitch axis 14, and yaw axis 16. Roll axis 22 corresponds to and is parallel in the nominal position, i.e., gimbal not rotated, to vehicle roll axis 12, pitch axis 24 corresponds to and is parallel in the nominal position to vehicle pitch axis 14, and yaw axis 26 corresponds to and is parallel in the nominal position to vehicle yaw axis 16.

The accelerometer based platform stabilization apparatus 20 is depicted as a cubical mounting base 27 rigidly attached to vehicle body 28. Alternatively, mounting base 27 may be passively isolated from the vehicle body 28. The edges of base 27 define axes 27x, 27y, and 27z that are parallel to axes 12, 14, and 16, respectively. A yaw assembly 30 is coupled to the mounting base 27 and operates to rotate a yaw gimbal 32 about a first gimbal axis shown as yaw axis 26. A pitch assembly 34 is coupled to yaw gimbal 32 and operates to rotate a pitch gimbal 36 about a second gimbal axis shown as pitch axis 24. A roll assembly 38 is coupled to pitch gimbal 36 and operates to rotate a roll gimbal 40 about a third gimbal axis shown as roll axis 22. A sensing device or other piece of equipment to be stabilized (not shown) is fixed to roll gimbal 40 centered at an origin 42 of a coordinate system defined by roll axis 22, pitch axis 24 and yaw axis 26. The choice of attaching yaw assembly 30 to the mounting base is shown in FIG. 2, but other orderings of the gimbals may be desirable in certain applications. The present invention should be considered to include other arrangements, for example, mounting the pitch gimbal to the mounting base, the roll gimbal to the pitch gimbal and the yaw gimbal to the roll gimbal.

Mounting base 27 has positioned about it linear accelerometer groups 44, 46, 48 and 50 at points A, B, C and D which lie at the corners of the mounting base 27. Accelerometer group 44 at point A comprises linear accelerometers 44a, 44b and 44c oriented along axes 27x, 27y and 27z corresponding to and parallel to the roll axis 12, pitch axis 14 and yaw axis 16, respectively. Accelerometer group 46 is positioned along axis 27x corresponding to and parallel to the roll axis 12 at a distance $R_{AB}$ from point A. Group 46 comprises linear accelerometers 46a, 46b, and 46c oriented along axes corresponding to and parallel to roll axis 12, pitch axis 14 and yaw axis 16, respectively. Accelerometer group 48 is positioned along axis 27y corresponding to and parallel to pitch axis 14 at a distance $R_{AC}$ from point A. Group 48 comprises linear accelerometers 48a, 48b and 48c oriented along axes corresponding to and parallel to roll axis 12, pitch axis 14, and yaw axis 16, respectively. Similarly, accelerometer group 50 is positioned along axis 27z corresponding to and parallel to yaw axis 16 at a distance $R_{AD}$ from point A. Group 50 comprises linear accelerometers 50a, 50b and 50c oriented along axes corresponding to and parallel to roll axis 12, pitch axis 14 and yaw axis 16, respectively. If the mounting base is rigidly attached to the vehicle body the accelerometer groups need not be mounted on the mounting base 27, and the measurements of accelerations of the vehicle will be the same as the measurements of the acceleration of the mounting base 27.

Gimbals 32, 36 and 40 have freedom to rotate with respect to the mounting base 27 around specific axes. Yaw gimbal 32 can rotate about (the first gimbal axis) yaw axis 26 by an angle Y, pitch gimbal 36 can rotate with respect to the yaw gimbal 32 about (second gimbal axis) pitch axis 24 by an angle P, and roll gimbal 40 can rotate with respect to the pitch gimbal 36 about (third gimbal axis) roll axis 22 by an angle R. To measure the angle of rotation of the sensing device to be stabilized (connected to gimbal 40), measurement signal means such as a resolver or synchro (not shown in FIG. 2) are mounted to roll assembly 38, pitch assembly 34 and yaw assembly 30. The rate of rotation and the angle of rotation are obtained from resolver-to-digital converters (not shown in FIG. 2).

The principle of operation of the accelerometer based platform stabilization apparatus is as follows: the outputs of the linear accelerometer groups 44, 46, 48 and 50 are used to calculate the angular accelerations of the mounting base (or equivalently, if the base is rigidly attached to the vehicle, the angular accelerations of the vehicle about its center of rotation 10), by calculating the values of $\dot{W}_1$, $\dot{W}_2$, and $\dot{W}_3$. Alternatively, three orthogonal angular accelerometers can be used for the same purpose but at a cost disadvantage. Using $\dot{W}_1$, $\dot{W}_2$ and $\dot{W}_3$ and the measurements of the current rate (R, P and Y) and angle ($\dot{R}$, $\dot{P}$, and $\dot{Y}$) of rotation of the sensing device, the required motion of the servo-motors in the roll assembly 38, pitch assembly 34 and yaw assembly 30 to stabilize the platform are computed. These values are used as setpoints to a velocity type control system, or alternatively, an acceleration type control system, which actuates the servo-motors so that the actual motion is equal to the commanded one, thus stabilizing the sensing device.

Stabilization of sensing or imaging devices or other objects involves stabilizing the line-of-sight of the object. Since the line-of-sight is a direction, it can be expressed as a vector. Therefore, if the line-of-sight is stabilized, i.e., not moving, the rate of change of the line-of-sight vector must be equal to zero. In a scanning mode, the line-of-sight is considered stabilized if it moves at a predetermined desired rate.

Referring to FIG. 3, Q represents the line of sight vector to be stabilized. Orthogonal axes $x_0$, $y_0$ and $z_0$ (as shown in FIG. 1) define a rotating frame corresponding to the vehicle, orthogonal axes $x_1$ $y_1$ $z_1$ define a rotating frame corresponding to roll gimbal 40; orthogonal axes $x_2$ $y_2$ $z_2$ define a rotating frame corresponding to pitch gimbal 36; and orthogonal axes $x_3$ $y_3$ $z_3$ define a rotating frame corresponding to yaw gimbal 32.

The rate of change of a vector with respect to a rotating frame is given by the fundamental equation:

$$\dot{Q}_f = \dot{Q}_m + W \times Q_m \quad (1)$$

where
$\dot{Q}_f$ is the time rate of change of the line-of-sight vector Q with respect to a fixed frame,
$\dot{Q}_m$ is the time rate of change of the vector Q within a rotating frame that rotates with respect to the fixed frame,
W is the angular velocity of the rotating frame with respect to the fixed frame,
$Q_m$ is the vector resolved into components along the x, y and z axes of the rotating frame and
X is the cross product operator.

By successively applying equation (1) to the frames in FIG. 3, the rate of change of the line-of-sight vector Q with respect to the inertial fixed frame x', y', z', (FIG. 1) can be obtained.

The first step is to fix the pitch gimbal and rotate the roll gimbal.

$$\dot{Q}_2 = \dot{Q}_1 + \dot{R} \times Q_1,$$

where R is the angular velocity of the roll gimbal with respect to the pitch gimbal. In a non scanning application, the rate of change of the line-of-sight vector within the inner gimbal is zero, and $Q_1 = 0$. For a scanning application, the value of $Q_1$ will be known, and can be externally supplied to the control system.

For simplicity, let $Q_1 = 0$ (non scanning). Vector Q within the inner gimbal is given by:

$$Q_1 = [Q_{x1} Q_{y1} Q_{z1}] \begin{bmatrix} i_1 \\ j_1 \\ k_1 \end{bmatrix}$$

where $Q_{x1}$ $Q_{y1}$ $Q_{z1}$ are the components in the x, y, and z, axes and i, j, and k give the unit vector set for the same axes. Substituting, $$\dot{Q}_2 = (\dot{R} i_1) \times (Q_{x1} i_1 + Q_{y1} j_1 + Q_{z1} k_1) \quad (2)$$

Step 2 is to fix the yaw gimbal and rotate the pitch gimbal.

$$\dot{Q}_3 = \dot{Q}_2 + \dot{P} \times Q_2$$

where P is the angular velocity of the pitch gimbal with respect to the yaw gimbal.

$$\dot{Q}_3 = \dot{Q}_2 + (\dot{P} j_2) \times (Q_{x2} i_2 + Q_{y2} j_2 + Q_{z2} k_2) \quad (3)$$

Using the relationships between the unit vectors of the roll and pitch gimbals from FIGS. 4a, 4b and 4c to express $Q_2$ in terms of $i_2$, $j_2$ and $k_2$, equation (2) can be substituted into equation (3). Those skilled in the art will understand that FIGS. 4a 4b and 4c show shows the relationship between the unit vectors of the roll, pitch, and yaw gimbals and the vehicle. These relationships are needed to perform the substitutions in equations (3), (4), and (5) so that the vector addition may be performed.

Similarly, vehicle frame is fixed and the yaw gimbal is rotated.

$$\dot{Q}_o = \dot{Q}_3 + \underline{Y} \times \underline{Q}_3.$$

where Y is the angular velocity of the yaw gimbal with respect to the vehicle frame.

$$\dot{Q}_o = \dot{Q}_3 + (\dot{Y}\underline{k}_3) \times (Q_{x3}\underline{i}_3 + Q_y\underline{j}_3 + Q_{z3}\underline{k}_3) \quad (4)$$

Again using the relationships of FIGS. 4a, 4b and 4c and noting that $\dot{Q}_3$ was calculated from equation (3), $Q_3$ is expressed in terms of $i_3$, $j_3$ and $k_3$ and substituted in equation (4). The process is repeated a fourth time from the vehicle frame to the inertial frame.

$$\dot{Q}_f = \dot{Q}_o + (W_1\underline{i}_o + W_2\underline{j}_o + W_3\underline{k}_o) \times (Q_{xo}\underline{i}_o + Q_{yo}\underline{j}_o + Q_{zo}\underline{k}_o) \quad (5)$$

Once again, $\dot{Q}_o$ was previously calculated and FIGS. 4a, 4b and 4c give the relation between the unit vector sets to express $Q_o$ in terms of $i_o$, $j_o$, and $k_o$. Also, $W_1$, $W_2$ and $W_3$ are the vehicle's rate of change in roll, pitch and yaw angles, respectively.

The stabilization criteria says, in a non scanning application, that the net rate of change of the line-of-sight vector with respect to an inertial frame (fixed frame) is zero ($\dot{Q}_f = 0$), or in a scanning application equal to a known value or function. Thus, given a vehicle rotation ($W_1$, $W_2$ $W_3$), equation (5) can be solved to obtain the necessary platform motion ($\dot{R}$, $\dot{P}$, $\dot{Y}$) so that the line-of-sight is stabilized with respect to the inertial frame.

An alternative expression for the stabilization criteria can be obtained by projecting all the rotational velocity vectors onto a common frame and equating the resultant to zero (non scanning application):

$$W_1\underline{i}_o + W_2\underline{i} + W_3\underline{k}_o + \dot{R}\underline{i}_1 + \dot{P}\underline{j}_2 + \dot{Y}\underline{k}_3 = 0 \quad (6)$$

Projecting all the vectors onto a common coordinate frame ($x_o$, $y_o$, $z_o$), and using the relationships shown in FIGS. 4a, 4b and 4c, the mounting base angular velocities (which are the same as the vehicle's if the platform is rigidly attached to it) are obtained:

$$W_1 = -(\dot{R} \cos P \cos Y - \dot{P} \sin Y)$$

$$W_2 = -(\dot{R} \cos P \sin Y + \dot{P} \cos Y) \quad (7)$$

$$W_3 = -(\dot{Y} - \dot{R} \sin P)$$

It can be shown that the stabilization equations (5) and (6) are equivalent when the appropriate substitutions are performed. From equations (7), the necessary gimbal motions, or velocity setpoints for the roll, pitch and yaw servo motors, can be obtained to stabilize the line-of-sight vector Q given the rates of rotation $W_1$, $W_2$ and $W_3$:

$$\dot{R}_{sp} = (-W_1 - W_2 \tan Y)/(\cos P \cos Y + \tan Y \cos P \sin Y)$$

$$\dot{P}_{sp} = (-W_2 - \dot{R}_{sp} \cos P \sin Y)/\cos Y \quad (8)$$

$$\dot{Y}_{sp} = -W_3 + \dot{R}_{sp} \sin P$$

These equations give the speed at which the servomotors need to rotate the gimbals so that the line-of-sight vector is stable. The control system uses these velocity setpoints to govern the operation of the servomotors, conforming to a velocity controller where the motor velocity follows a given profile. This velocity control strategy is an optional control strategy used in the preferred embodiment of this invention.

Alternatively and preferably, platform stabilization can also be accomplished using an acceleration control system where the motor acceleration (or equivalently its torque) is regulated. In this configuration, the stabilization criteria is obtained by projecting all the rotational acceleration vectors onto a common frame and equating the result to zero (non scanning application):

$$\dot{W}_1\underline{i}_o + \dot{W}_2\underline{j}_o + \dot{W}_3\underline{k}_o + \ddot{R}\underline{i}_1 + \ddot{P}\underline{j}_2 + \ddot{Y}\underline{k}_3 = \underline{0} \quad (9)$$

where $\dot{W}_1$, $\dot{W}_2$, and $\dot{W}_3$ are the angular accelerations of the mounting base in roll, pitch, and yaw respectively; and $\ddot{R}$, $\ddot{P}$, and $\ddot{Y}$ are the angular accelerations of the gimbals in roll, pitch, and yaw, respectively.

Again, projecting all the vectors onto a common coordinate frame ($x_o$, $y_o$, $z_o$) and using the relationships shown in FIGS. 4a, 4b and 4c, the platform base angular accelerations are obtained:

$$\dot{W}_1 = -(\ddot{R} \cos P \cos Y - \ddot{P} \sin Y)$$

$$\dot{W}_2 = -(\ddot{R} \cos P \sin Y + \ddot{P} \cos Y) \quad (10)$$

$$\dot{W}_3 = -(\ddot{Y} - \ddot{R} \sin P)$$

From equations (10), the necessary gimbal motions, or acceleration setpoints for the roll, pitch and yaw servo motors, can be obtained to stabilize the line-of-sight vector Q given the rates of acceleration $W_1$, $W_2$ and $W_3$:

$$\ddot{R}_{sp} = (-\dot{W}_1 - \dot{W}_2 \tan Y)/(\cos P \cos Y + \tan Y \cos P \sin Y)$$

$$\ddot{P}_{sp} = (-\dot{W}_2 - \ddot{R}_{sp} \cos P \sin Y)/\cos Y \quad (11)$$

$$\ddot{Y}_{sp} = -\dot{W}_3 + \ddot{R}_{sp} \sin P$$

These equations give the values the servo-motors need to accelerate the gimbals so that the line-of-sight vector is stable. Forcing the net angular acceleration of the line-of-sight to be zero causes it to slew at a constant rate. For this rate to be zero, and thus completely stabilize the line-of-sight, velocity and position feedbacks are used in the acceleration control system. This acceleration control strategy is also used in the preferred embodiment of this invention. A different arrangement or ordering of the gimbals is possible, and the set of setpoint equations (equations 8 and 11) will be slightly different with a different order of gimbals. However, the method of obtaining these equations for the embodiment of the invention disclosed herein applies to other gimbal arrangements, and the present invention is intended to cover such alternative arrangements.

The total motion of the platform, translation and/or rotation, is determined by using an arrangement of linear accelerometers, or, alternatively, an arrangement of angular accelerometers. Linear accelerometers are, at the present time, much less expensive than angular accelerometers. However, this may change over time.

For the most general use of three dimensional rigid body dynamics, an arrangement of 4 tri-axial or 12 single axis, linear accelerometers as shown in FIG. 2 provides complete information about the motion of the platform. The arrangement of the linear accelerometers as shown in FIG. 2 is not the only possible arrangement, and the scope of the present invention should be considered to include other arrangements.

Figure 10:
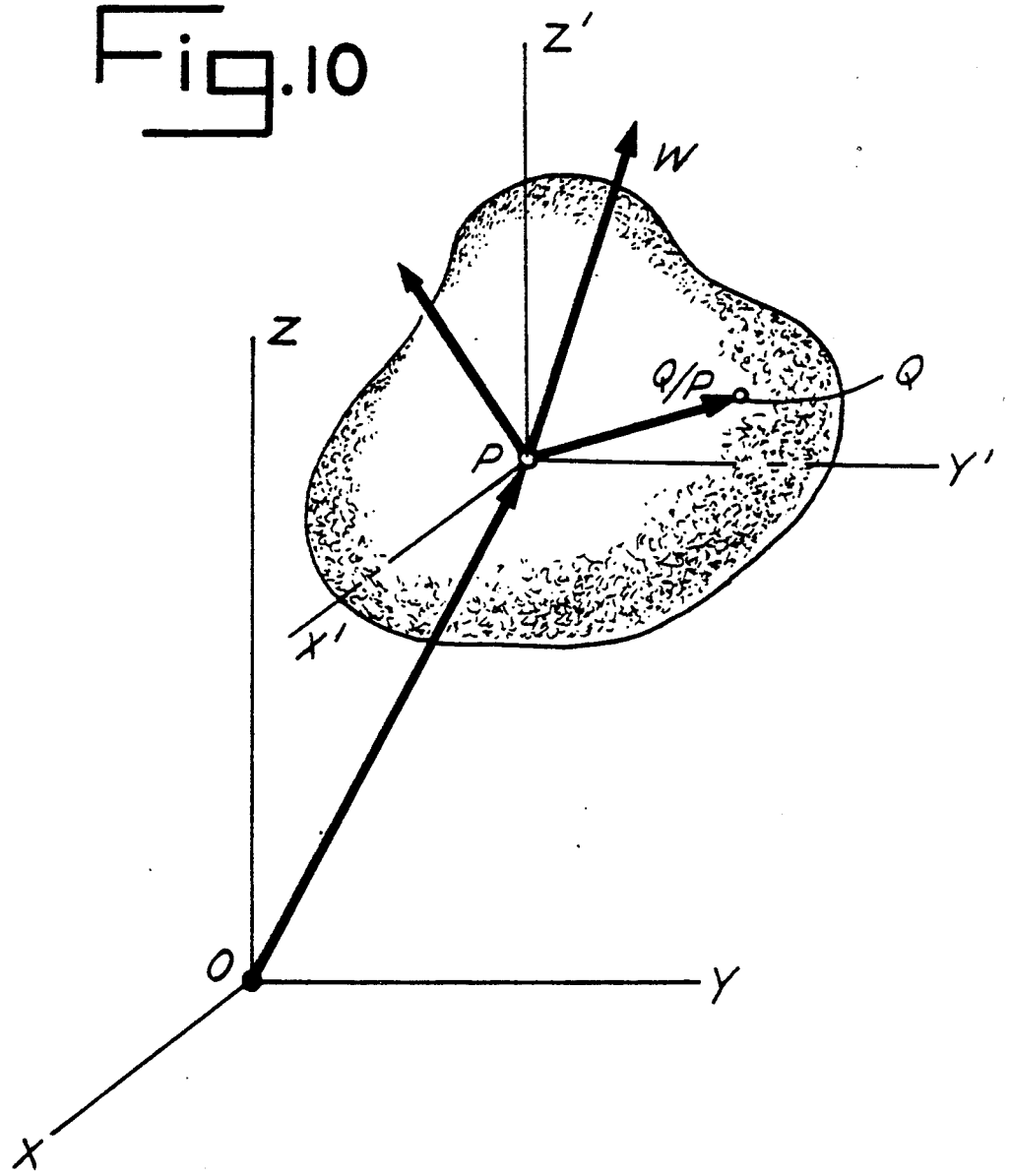
FIG. 10 is a diagram showing vectors used to derive the components of acceleration of the vehicle shown in FIG. 2.

Referring to FIG. 10, the total acceleration of an arbitrary point Q with respect to the inertial coordinate frame attached to O is given by:

$$\underline{A_Q} = \underline{A_P} + \underline{\dot{W}} X \underline{PQ} + \underline{W} X (\underline{W} X \underline{PQ})$$

where
$A_P$ is the acceleration of P with respect to O
$\dot{W}$ is the angular acceleration of the body
$\overline{W}$ is the angular velocity of the body
$\overline{PQ}$ is the vector between P and Q.
X is the cross product operator.

In FIG. 10, point O corresponds to center of rotation 10 of FIG. 2; point P corresponds to point A of FIG. 2; arbitrary point Q corresponds to origin O' 42 in FIG. 2 where the sensing device is located. Applying the equation to the linear accelerometer arrangement of FIG. 2, and manipulating the resulting equations, the following general result is obtained:

$$\dot{W}_1 = [(A_C{}^z - A_A{}^z)/2R_{AC}] - [(A_D{}^y - A_A{}^y)/2R_{AD}]$$

$$\dot{W}_2 = [(A_D{}^x - A_A{}^x)/2R_{AD}] - [(A_B{}^z - A_A{}^z)/2R_{AB}] \quad (12)$$

$$\dot{W}_3 = [(A_B{}^y - A_A{}^y)/2R_{AB}] - [(A_C{}^x - A_A{}^x)/2R_{AC}]$$

where $A_C{}^z$ is the acceleration measured by the linear accelerometer at point C in FIG. 2 in the Z direction, or accelerometer 48c, $A_A{}^z$ is the acceleration measured by the linear accelerometer at point A in FIG. 2 in the z direction, or accelerometer 44c, and so on. $R_{AC}$ is the distance between the accelerometer groups 44 and 48, points A and C, and so on. Alternatively, $\dot{W}_1$, $\dot{W}_2$, and $\dot{W}_3$ can be obtained from three orthogonal angular accelerometers. Integration of equations (12) yields the values of angular velocity $W_1$, $W_2$, $W_3$ to be substituted into the velocity setpoint command equation, equation (8). Alternatively, equations (12) can be substituted directly into equations (11) without integration when the acceleration control strategy is implemented. Time integration of the angular velocity equations gives the angular position, but the angular position can be obtained directly by means of a transducer such as a resolver.

Further manipulation of the equations gives:

$$W_1 W_2 = [(A_B{}^y - A_A{}^y)/2R_{AB}] + [(A_C{}^x - A_A{}^x)/2R_{AC}]$$

$$W_1 W_3 = [(A_B{}^z - A_A{}^z)/2R_{AB}] + [(A_D{}^x - A_A{}^x)/2R_{AD}]$$

$$W_2 W_3 = [(A_C{}^z - A_A{}^z)/2R_{AC}] + [(A_D{}^y - A_A{}^y)/2R_{AD}]$$

and $$W_1{}^2 = (A_B{}^x - A_A{}^x)/2R_{AB} - (A_C{}^y - A_A{}^y)/2R_{AC} - (A_D{}^z - A_A{}^z)/2R_{AD}$$

$$W_2{}^2 = (A_C{}^y - A_A{}^y)/2R_{AC} - (A_B{}^x - A_A{}^x)/2R_{AB} - (A_D{}^z - A_A{}^z)/2R_{AD}$$

$$W_3{}^2 = (A_D{}^z - A_A{}^z)/2R_{AD} - (A_B{}^x - A_A{}^x)/2R_{AB} - (A_C{}^y - A_A{}^y)/2R_{AC}$$

The first three equations from above give the cross product of the angular velocities. The last three equations give the square of the angular velocities. Notice how the product of two angular velocities is obtained from a linear combination of the accelerometer outputs. This is a key result, because the time average of these signals provides, for ergodic motion, the correlation between the angular velocities. Furthermore, if the angular velocities are zero means, the covariance matrix of $\underline{W}$ can be directly obtained by proper ordering of these time averages as given below (E[ ] represents the expected value operator):

$$cov(\underline{W}) = \begin{vmatrix} E[W_1{}^2] & E[W_1 \cdot W_2] & E[W_1 \cdot W_3] \\ E[W_1 \cdot W_2] & E[W_2{}^2] & E[W_2 \cdot W_3] \\ E[W_1 \cdot W_3] & E[W_2 \cdot W_3] & E[W_3{}^2] \end{vmatrix}$$

Thus, the 12 accelerometer scheme measures the cross-product of the angular velocities providing the necessary information for the computation of the statistics of the angular motion as a stochastic process. Accurate knowledge of this statistics becomes of significant importance when optimal state estimators, such as Kalman Filters, are used to evaluate the true value of the angular motion.

It has already been noted that the 12 accelerometer arrangement shown in FIG. 2 is not the only possible arrangement of linear accelerometers. For example, a 9 accelerometer arrangement may prove satisfactory. The arrangement of FIG. 2 not only measures the angular acceleration of the rigid body, but also it measures the cross-product between the angular velocities. In some applications only the three dimensional angular acceleration data would be of interest and the number of accelerometers can be reduced to nine. The equations previously developed still hold and are repeated below:

$$\dot{W}_1 = [(A_C{}^z - A_A{}^z)/2R_{AC}] - [(A_D{}^y - A_A{}^y)/2R_{AD}]$$

$$\dot{W}_2 = [(A_D{}^x - A_A{}^x)/2R_{AD}] - [(A_B{}^z - A_A{}^z)/2R_{AB}] \quad (12)$$

$$\dot{W}_3 = [(A_B{}^y - A_A{}^y)/2R_{AB}] - [(A_C{}^x - A_A{}^x)/2R_{AC}]$$

Notice the three accelerometers eliminated were those measuring $A_B{}^x$, $A_C{}^y$, and $A_D{}^z$, accelerometers 46a, 48b, and 50c, whose outputs do not appear in the above equations.

In certain applications it may only be necessary to know rotations with respect to two of the three orthogonal axes, even though the body may be rotating with respect to all three axes. For example, if $\dot{W}_1$ and $\dot{W}_2$, or $\dot{W}_1$ and $\dot{W}_3$, or $\dot{W}_2$ and $\dot{W}_3$, are needed, then only seven accelerometers are required to measure the individual subsets of data. The accelerometers needed for the given configuration are easily identified from the angular acceleration equations (12).

In cases where the angular acceleration value is considerably larger than the angular velocity, an arrangement of five linear accelerometers will provide sufficiently accurate information of angular acceleration of the body. The choices for accelerometer placement are numerous. For example, selecting the accelerometers measuring $A_A{}^y$, $A_A{}^z$, $A_B{}^y$, $A_B{}^z$, and $A_C{}^z$ the following relationships are applicable:

$$\dot{W}_1 = (A_C{}^z - A_A{}^z)/R_{AC} - W_2 \cdot W_3$$

$$\dot{W}_2 = (A_A{}^z - A_B{}^z)/R_{AB} + W_1 \cdot W_3$$

$$\dot{W}_3 = (A_B{}^y - A_A{}^y)/R_{AB} - W_1 \cdot W_2$$

For small angular velocities, in comparison to the accelerations, the cross-products $W_2.W_3$, $W_1.W_3$, $W_1.W_2$ are negligible, and the five accelerometer arrangement could be used to obtain an adequate measurement of the angular accelerations.

The five accelerometer arrangement can be further simplified if the vehicle observes pure rotational motion, no translation, and point A (in FIG. 2) coincides with point O (the center of rotation of the vehicle). In that case, the three sensor arrangement gives the following identities:

$$\dot{W}_1 = A_C{}^z/R_{AC} - W_2.W_3$$

$$\dot{W}_2 = -A_B{}^z/R_{AB} + W_1.W_3$$

$$\dot{W}_3 = A_B{}^y/R_{AB} - W_1.W_2$$

Again, for small angular velocities, in comparison to the angular accelerations, the cross-products $W_2.W_3$, $W_1.W_3$, and $W_1.W_2$ are negligible, and the three accelerometer arrangement could be used to obtain an approximate measurement of the angular accelerations. Furthermore, if only one of the above angular accelerations is of interest, a single accelerometer would suffice.

It is preferable to measure the linear accelerations in a location close to the position of the object to be stabilized. However, it is theoretically possible to make the measurements of linear acceleration in a remote location and computationally derive the angular acceleration or angular velocities at the location of the stabilized object. For example, one could use the angular velocity information from an inertial navigation system or other remote angular velocity sensors as $W_1$, $W_2$ and $W_3$ for use in the generation of the setpoint commands. The scope of the present invention is intended to cover this scenario.

The above derivation of the angular acceleration and velocity from linear accelerometer outputs applies when linear accelerometers are used to measure the vehicle's motion. However, angular accelerometers can be used to generate the values of $\dot{W}_1$, $\dot{W}_2$, and $\dot{W}_3$ and $W_1$, $W_2$, and $W_3$, with less computational complexity but at a much higher cost of components. If angular accelerometers are the desired components, three angular accelerometers may be placed on the mounting base 27 or the vehicle 28, each accelerometer positioned so that it measures angular accelerations about an axis corresponding to one of the three principal vehicle axes, roll, pitch, or yaw.

The angular velocities $W_1$, $W_2$, and $W_3$ can also even be measured on the mounting base directly with gyro or other angular velocity sensors. In this case, the platform stabilization apparatus does not use accelerometers, but at present there are cost disadvantages to this implementation of the present invention. The present invention is intended to cover the case where $W_1$, $W_2$, and $W_3$ are measured by a velocity sensor and provided as inputs for setpoint generation according to the stabilization technique disclosed.

If the mounting base 27 is passively isolated from the vehicle, the accelerometers are placed on the mounting base 27. If the mounting base 27 is rigidly attached to the vehicle, then the accelerometers may be placed on the vehicle 28 or the base 27. The output of the three angular accelerometers will be $\dot{W}_1$, $\dot{W}_2$, and $\dot{W}_3$, and integration of these values gives $W_1$, $W_2$, and $W_3$. These values then are used in either equations (8) or equations (11) depending on whether a velocity or an acceleration control strategy is implemented.

DETAILED DESCRIPTION OF THE PREFERRED EMBODIMENT

Figure 6:
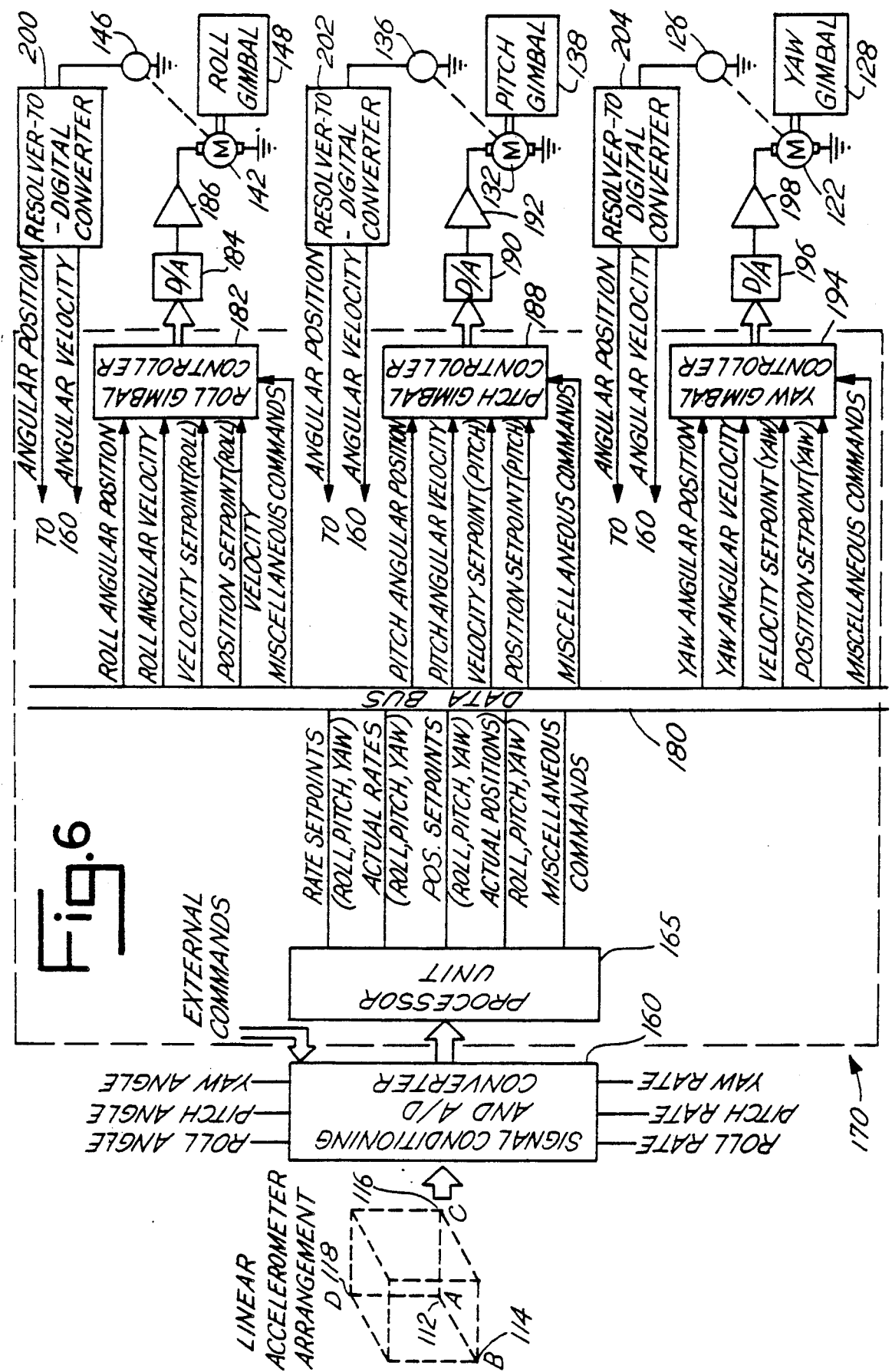
FIG. 6 is a schematic functional block diagram of a preferred embodiment of a control system for use in the preferred embodiment of the invention of FIG. 5.

Referring to FIGS. 5 and 6, an accelerometer based platform stabilization apparatus is shown for three axis stabilization of an imaging device, such as a T.V. camera 150. A mounting base 110 is fixed to the frame of a vehicle 100 by means of passive isolators (not shown) in conventional fashion. In the preferred embodiment of the invention, a yaw assembly 120 is mounted on mounting base 110.

Yaw assembly 120 contains a servo motor 122 (FIG. 6) that rotates a gimbal 128 on a bearing (not shown) about a yaw axis $Y_1$. Depending on the application, servo motor 122 (FIG. 6) can be an Inland Model T-4411, an Inland RBE-01205 brushless servo motor or a Magnetic Technology 4590 C-043 rare earth magnet servo motor. Preferably, the servo motor has an armature suitable for responding to a setpoint command. Yaw assembly 120 also comprises a transducer shown here as resolver 126 (FIG. 6), that acts as a measurement signal means to measure the angle through which gimbal 128 has rotated around axis $Y_1$. A Vernitron VRP22 resolver or a Vernitron VSP 20 synchro are suitable for the measurement signal means. The rate of rotation of yaw gimbal 128 is obtained from a tachometer or from a resolver-to-digital converter 204 (FIG. 6), such as a Natel OSC 5116/ORC 5116 synchro/resolver-to-digital converter, or Natel H2501626/H2RD1626 or Natel SD570/RD570.

Attached to yaw gimbal 128 is a pitch assembly 130 (FIG. 5) shown in exploded view comprising servo motor 132 (FIG. 5 and FIG. 6) that rotates a pitch gimbal 138 about a pitch axis $P_1$ on a pair of bearings 134 and 135. A transducer, here shown as resolver 136 (FIG. 5 and FIG. 6) attached to pitch gimbal 138, like resolver 126, operates as a measurement signal means to measure the angle of rotation of pitch gimbal 138 around axis $P_1$. A cover plate 137 (FIG. 5) covers the pitch assembly. The rate of rotation of pitch gimbal 138 is provided by a resolver-to-digital converter 202 (FIG. 6).

Attached to pitch gimbal 138 is a roll assembly 140 (FIG. 5), including a servo motor 142 (FIG. 6) that rotates a roll gimbal 148 on a bearing (not shown). Roll gimbal 148 has mounted to it an imaging device 150 (FIG. 5) to be stabilized about the roll, pitch and yaw axes. A transducer, here shown as resolver 146 (FIG. 6) measures the angle of rotation of roll gimbal 148 about the roll axis $R_1$, and the rate of rotation is obtained by a resolver-to-digital converter 200 (FIG. 6). Those of ordinary skill in the art will realize that the rate of rotation and the angle of rotation can be derived from one another, provided that one or the other is a measured quantity.

Referring to FIG. 5, linear accelerometer groups 112, 114, 116, and 118 are positioned on mounting base 110 at points A, B, C and D. Group 112 contains linear accelerometers 112a, 112b, and 112c oriented along axes corresponding to and parallel to roll, pitch, and yaw axes $R_1$, $P_1$ and $Y_1$, respectively. Group 114 comprises a linear accelerometers 114b and 114c, oriented along axes corresponding to and parallel to pitch axis $P_1$ and yaw axis $Y_1$, respectively. Group 116 comprises linear accelerometers 116a and 116c oriented along axes corresponding to and parallel to roll axis $R_1$ and yaw axis $Y_1$, respectively. Group 118 comprises linear accelerometers 118a and 118b oriented along axes corresponding to and parallel to roll axis $R_1$ and pitch axis $P_1$, respectively.

In certain applications of the present invention, it may be desirable to increase the sensitivity of the accelerometers all the way down to the DC term; for that reason, piezoresistive or servo accelerometers may be selected. In other applications where the DC response is accounted for by an external device, such as a tracker, piezoelectric type accelerometers, with no DC response, may be acceptable. Common, off the shelf linear accelerometer components that may be suitable are the IC sensors 3021, Entran EGD-240-D single axis and Entran EGV3-C multi-axis, PCB 321A single axis, Systron Donner 4855F single axis, and Endevco 2223D multi-axis linear accelerometers.

As shown in FIG. 6, the accelerometer based platform stabilization system includes a control system for performing the following functions:
(1) stabilizing the platform based on accelerometer output,
(2) slewing and positioning the line-of-sight of the imaging device as commanded by externally supplied inputs,
(3) providing electronic compensation and filtering,
(4) monitoring the system operation,
(5) implementing failsafe/limp home modes of operation,
(6) communicating with peripheral devices, and
(7) performing miscellaneous tasks.

The outputs from linear accelerometer groups 112, 114, 116 and 118 are fed to a signal conditioning and analog-to-digital converter constituting input module 160. The outputs from the yaw, pitch and roll resolvers, 126, 136 and 146, measuring angular rotations, are fed to the resolver-to-digital converters 200, 202, and 204, which in turn provides digital outputs for the angular position of the gimbals, and analog outputs for the angular velocity of the gimbals, to input module 160. External commands are also fed to input module 160. The digital outputs of module 160 are fed to a data processor unit 165 in the microcomputer 170. Alternatively, a dedicated DSP chip could be used for microcomputer 170. The processor unit 165 uses the digitized outputs to calculate the roll, pitch and yaw setpoints according to the stabilization criteria of equations (8) and (9). Externally fed positions setpoints can be supplied to the microcomputer 170 to slew the platform to a desired position. A Prolog 7863-3 microcomputer or Omnibyte OB68K/VSBC20 single board computer are suitable microcomputers, as are the Analog Devices RTI-1260 (analog input card) and Analog Devices RTI-1262 (analog output card). A person of ordinary skill in the art will be able to program the microcomputer 170 to implement the stabilization technique disclosed herein.

Processor unit 165 sends the rate setpoints, actual rates, position setpoints, actual positions and miscellaneous commands over a data bus 180 to the roll gimbal controller 182, the pitch gimbal controller 188 and the yaw gimbal controller 194. The gimbal controllers shown in the functional block diagram of FIG. 6 are not seperate pieces of hardware in the preferred embodiment, but are implemented in the software of the microcomputer 170 that incorporates the processor unit 165, data bus 180, and the controllers 182, 188 and 194. It is possible, however, to implement a control system with the gimbal controller functions performed by discrete processing units.

Referring again to FIG. 6, the roll motor movement command is sent from the roll gimbal controller 182 (part of the microcomputer system) through a digital to analog converter 184 and a power amp 186 to roll motor 142 which rotates roll gimbal 148. Resolver 146 measures the roll rotation, and converter 200 sends the angular position and velocity to module 160. Similarly, the pitch motor movement command is sent from the pitch gimbal controller 188 through a digital to analog converter 190 and a power amp 192 to pitch motor 132, which rotates pitch gimbal 138. Resolver 136 measures the pitch rotation, and converter 202 sends the angular position and velocity to module 160. Similarly, the yaw motor movement command is sent from the yaw gimbal controller 194 through a digital to analog converter 196 and a power amp 198 to motor 122, which rotates yaw gimbal 128. Resolver 126 measures the angle of yaw rotation and converter 204 sends the angular position and velocity to module 160.

Figure 7A:
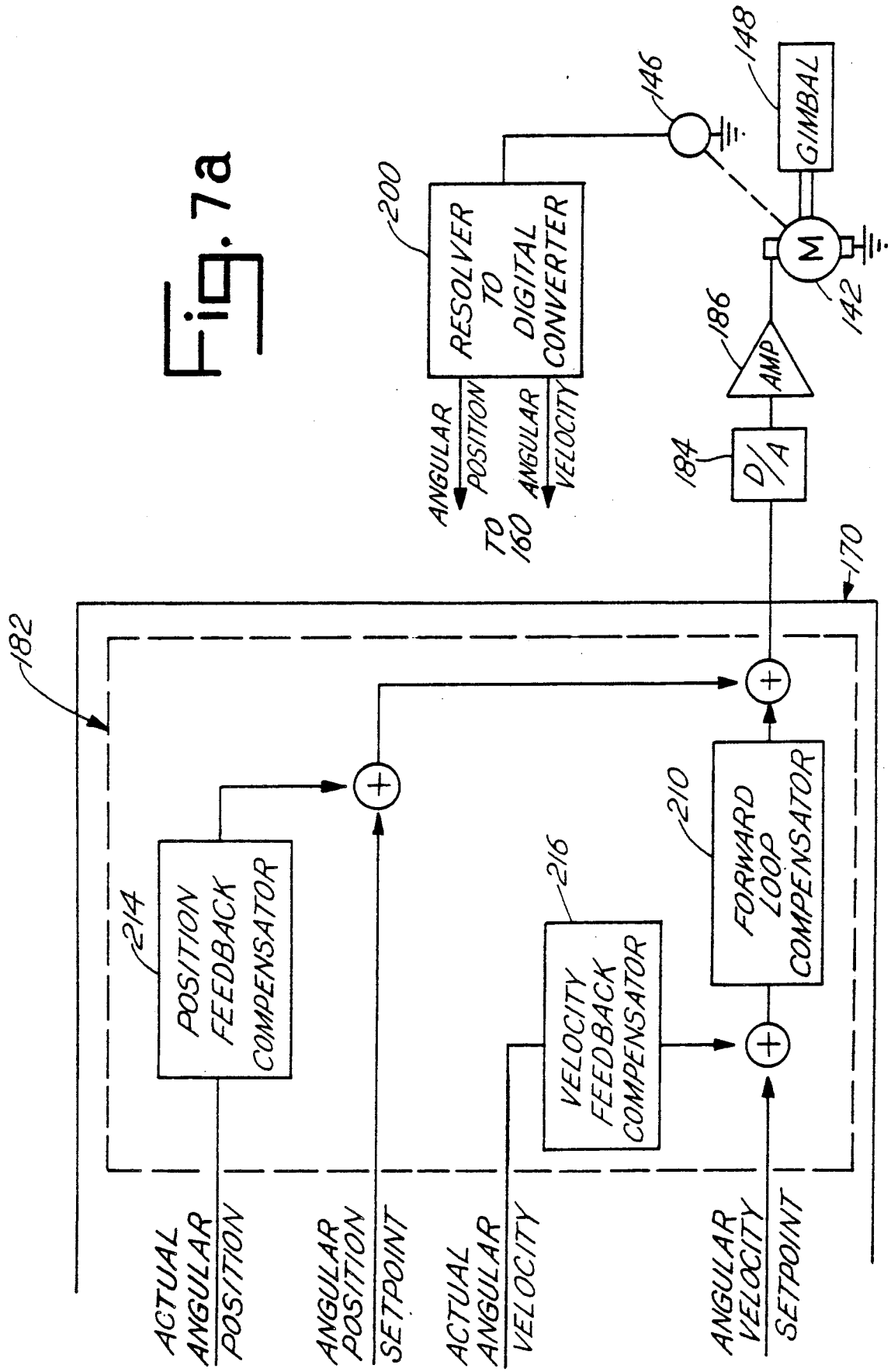
FIGS. 7a and 7b are schematic functional block diagrams of a preferred form of gimbal controller for use in the control system of the preferred embodiment of FIG. 6.

FIG. 7a is a schematic functional block diagram of a preferred form of roll gimbal controller 182 (software implemented in the microcomputer 170) implementing the velocity control system for this embodiment. Dynamic platform stabilization is accomplished through a velocity feedback compensator 216 and forward loop compensator 210, while the long term line-of-sight pointing (or platform slewing) is carried out by position feedback compensator 214, with low pass characteristics, which also overcomes drift problems and uncertainty in the initial velocity conditions that occur during the integration of angular accelerations to obtain angular velocities. The "+" signifies the summation operation. Pitch gimbal controller 188 and yaw gimbal controller 194 are identical to roll gimbal controller 182.

The compensators 210, 214 and 216 are providing signal compensation according to classical control theory, of which those of ordinary skill in the art are familiar. Reference is here made to exemplary texts on control theory: K. Ogata, Modern Control Engineering, ch. 4; DC Motors, Speed Controls, Servo Systems—An Engineering Handbook, published by Electro-Craft Corp.; S. Shinners, Modern Control System Theory and Application, 2d. Ed., ch. 2.

The movement signals, which are the setpoint commands after being subject to velocity and position feedback compensation and forward loop compensation, are sent to power amp 186, actuating servo motor 142, and rotating roll gimbal 148.

Referring to FIG. 6, as the vehicle is undergoing rotational motion about its axes, setpoint commands for the roll, pitch and yaw motors are continuously generated, as are the movement signals, thereby causing roll, pitch, and yaw motors 142, 132 and 122 to continuously and simultaneously operate to stabilize the sensing device.

ALTERNATIVE CONTROL STRATEGY FOR THE PREFERRED EMBODIMENT

An alternative control strategy for the preferred embodiment, discussed previously, implements the acceleration control strategy (Eq. 11) instead of the velocity control strategy (Eq. 8). FIGS. 5 and 6 are still fully applicable as well as their associated text; however, the term "rate setpoint" for the roll, pitch, and yaw gimbals now correspond to angular acceleration setpoints instead of velocity setpoints. Again, the function of the gimbal controllers is carried out in software of the microcomputer.

Figure 7B:
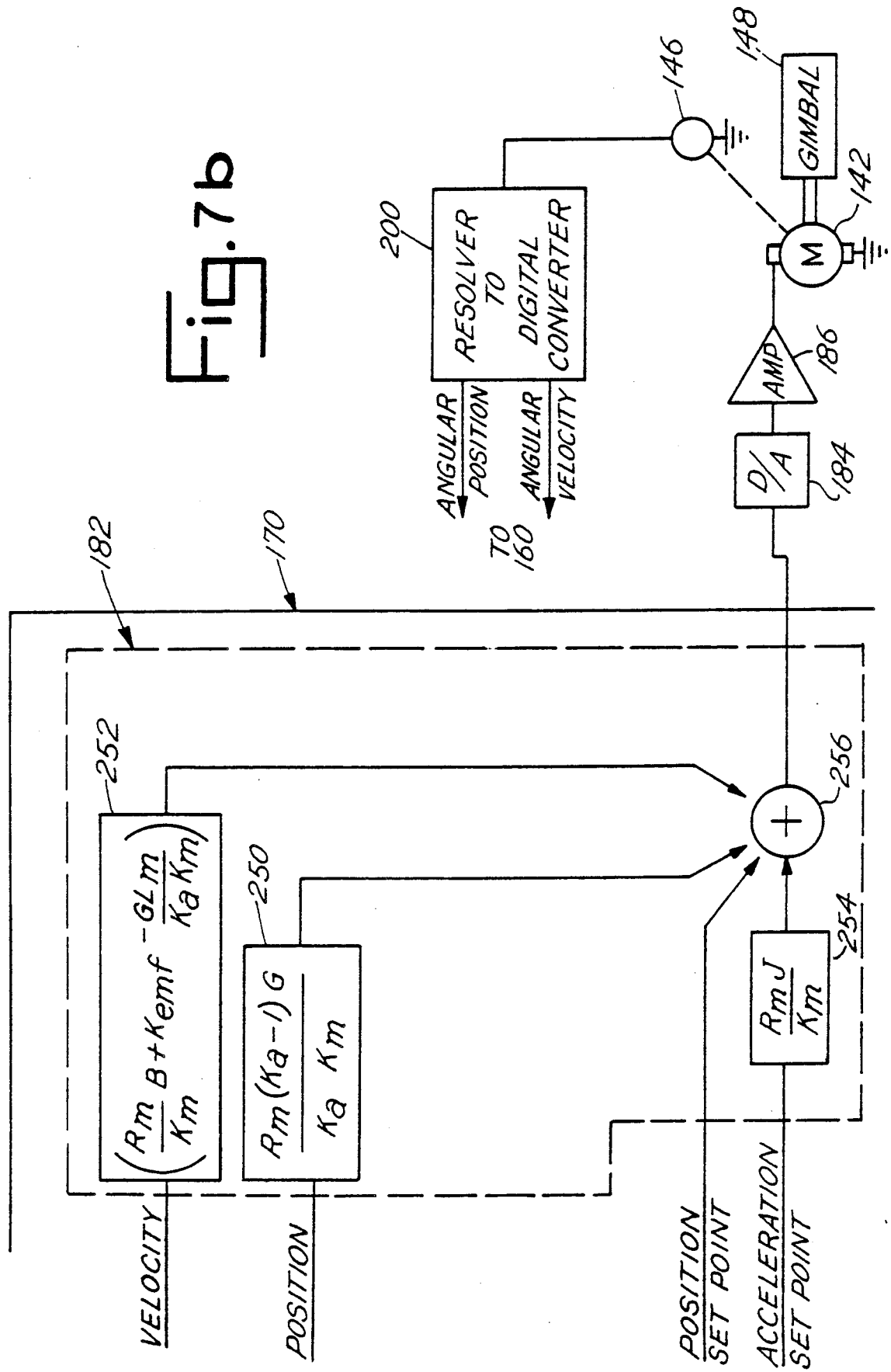

FIG. 7b is a schematic functional block diagram of a preferred form of roll gimbal controller 182 implementing via software in the microcomputer 170 the acceleration control strategy in this instance. Dynamic stabilization is accomplished through the closed loop feedback system by adjusting the roll acceleration setpoint command and subjecting it to position feedback compensation 250, velocity feedback compensation 252, and forward loop compensation 254. Line-of-sight pointing is obtained by the insertion of the roll position setpoint command at summing junction 256.

The setpoint commands, after being subject to velocity and position feedback compensation and forward loop compensation, are sent to power amp 186, actuating servo motor 142, and rotating roll gimbal 148. Pitch gimbal controller 188 and yaw gimbal controller 194 are identical to roll gimbal controller 182.

In the acceleration control strategy of the preferred embodiment, the main purpose of the gimbal controller is to maintain the actual angular acceleration ($\ddot{R}$) equal to the commanded one ($\ddot{R}_{sp}$). The power amplifier voltage (armature voltage) for a DC servo motor to provide the necessary movement signals to stabilize the gimbal is given by:

$$V_a = K_a \left[ \left( \frac{R_m J}{K_m} \right) \ddot{R}_{sp} + \left( \frac{R_m B}{K_m} + K_{emf} - \frac{G L_m}{K_a K_m} \right) \dot{R} + \left( \frac{R_m (K_a - 1)}{K_a K_m} \right) G \right) R + R_{sp} \right]$$

where
$R_m$ = Motor Resistance
$K_m$ = Motor Constant
$J$ = Moment of inertia (motor and load)
$B$ = Viscous—Friction/Damping Coefficient
$K_{emf}$ = Back emf constant
$G$ = Torsional Spring constant
$L_m$ = Motor inductance
$\dot{R}$ = Angular Velocity (feedback)
$R$ = Angular Position (feedback)
$\ddot{R}_{sp}$ = Acceleration Setpoint Command
$R_{sp}$ = Position set point command
$K_a$ = Amplifier Gain The compensators in FIG. 7b implement this equation as shown. The ultimate form of these compensators may vary slightly if additional gain or phase compensation is needed to achieve proper control stability. A principal advantage of the controller shown in FIG. 7b is that the spring effect is electronically implemented in the software, without having to physically install a torsion spring in the gimbal. Furthermore, an additional advantage is that the spring constant G can be easily changed by the operator in real time operation to adjust to different operating conditions, for example, during a period of extreme turbulence. To reduce the time constant of the position loop (increase its natural frequency), a larger spring constant should be selected, which gives the effect of stiffening up the suspension of the gimbal. Conversely, to smoothen the position response a softer (smaller) spring constant G should be selected (again, electronically). With a softer spring, the platform performance becomes closer to a truly inertially stabilized system.

Referring to FIG. 6, as the vehicle is undergoing rotational motion about its axes, movement signals incorporating the setpoint commands for the roll, pitch and yaw motors are continuously generated, thereby causing roll, pitch, and yaw motors 142, 132 and 122 to continuously and simultaneously operate to stabilize the object 150 (FIG. 5).

The alternative means for deriving the mounting base's angular accelerations of the preferred embodiment of the invention is accomplished by replacing the linear accelerometer arrangement with three orthogonal angular accelerometers, such as the Systron Donner model 4591F-10-P21, but presently at a higher cost. Combinations of linear and angular accelerometers are also possible. These angular accelerometers can be located anywhere on the mounting base 110 and they are preferably aligned with the vehicles's body coordinates $x_o$, $y_o$, and $z_o$. FIGS. 5, 6, and 7a or 7b are representative of the system and the general operation of the system is as previously described. If the mounting base is passively isolated from the vehicle, the accelerometers are placed on the mounting base, otherwise they may be placed on the vehicle or the base, and in either case the measurement is of the motion of mounting base 110.

ALTERNATIVE EMBODIMENT OF THE INVENTION

Figure 9:
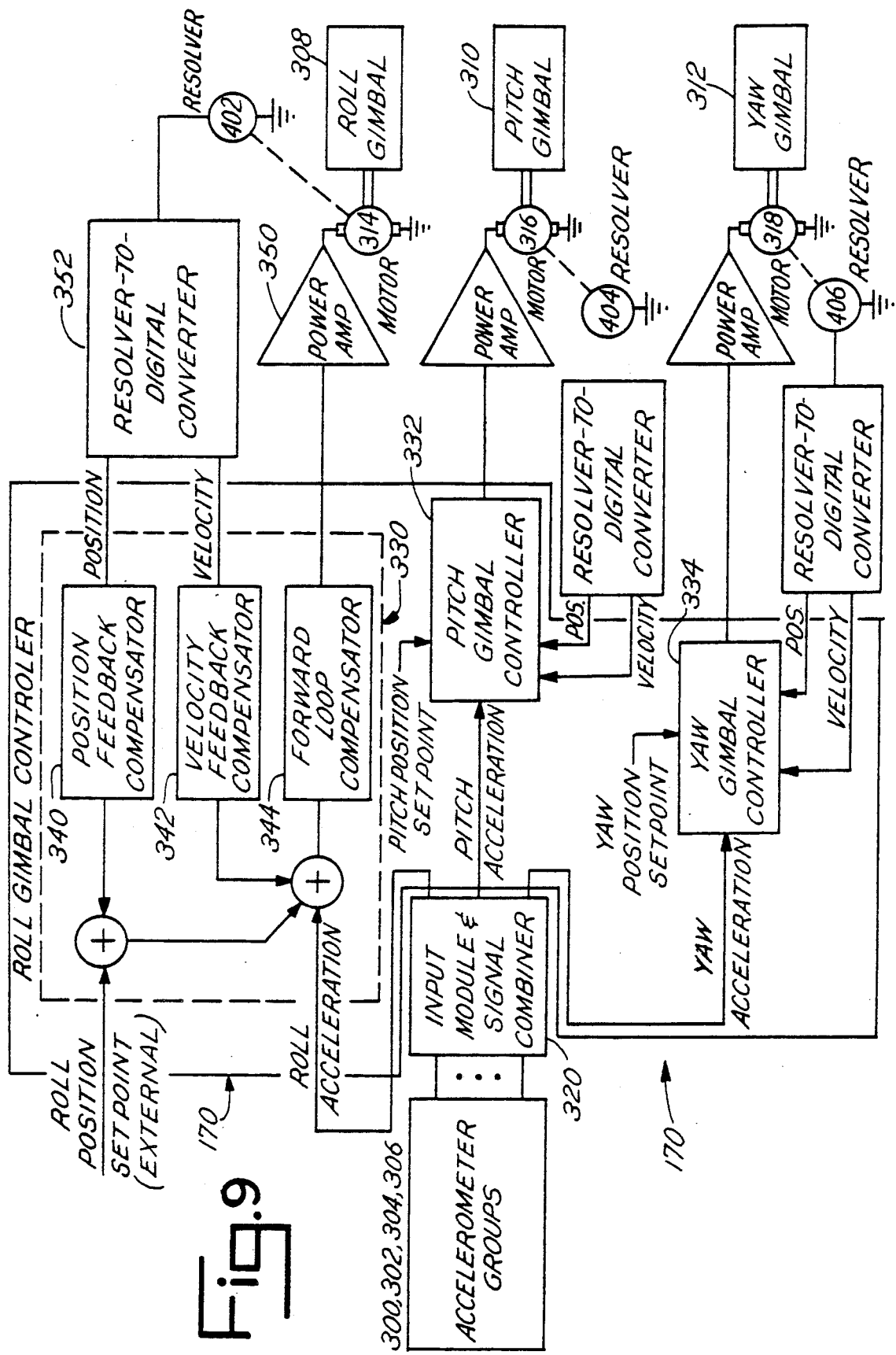
FIG. 9 is a schematic functional block diagram of a control system for use in the alternative embodiment of the invention of FIG. 8.

Referring to FIG. 8, means for measuring linear accelerations comprising linear accelerometer groups 300, 302, 304, and 306 are positioned directly on a stabilized element 308 such as a frame. The stabilized element defines an orthogonal coordinate system, and the accelerometers are oriented along the roll, pitch, and yaw axes (i.e. axes x, y and z, respectively, of the coordinate system) as shown in FIG. 8. Rotatable gimbal 309 is coupled to pitch gimbal 310, which in turn is coupled to yaw gimbal 312. Motors 314, 316 and 318 together comprise a motor driving means for rotating the gimbals. Roll motor 314 operates to rotate the roll gimbal 308, pitch motor 316 operates to rotate pitch gimbal 310, and yaw motor 318 operates to rotate yaw gimbal 312. The command strategy is to force the gimbal counter rotations so that the properly combined outputs of these linear accelerometer sensors are urged towards a null value, without specifically measuring the vehicle motion. The accelerometer groups 300, 302, 304 and 306 are measuring the net motion components of the platform plus the vehicle rotations, which are represented in FIG. 8 by $R_g$, $P_g$, and $Y_g$, for roll, pitch, and yaw gimbal rotations, respectively. The outputs of accelerometer groups 300, 302, 304 and 306 are fed to a control system such as shown in FIG. 9.

Making use of the stabilization equations set forth previously, but projecting all the vectors corresponding to the angular accelerations, instead of the angular velocities, the net angular accelerations of the stabilized body is given by:

$$\underline{A} = \ddot{R}_g \underline{i}_1 + \ddot{P}_g \underline{i}_2 + \ddot{Y}_g \underline{k}_3 + \dot{W}_1 \underline{i}_0 + \dot{W}_2 \underline{j}_0 + \dot{W}_3 \underline{k}_0$$

where $R_g$, $P_g$, $Y_g$, are angular accelerations of the gimbals; $\dot{W}_1$, $\dot{W}_2$ and $\dot{W}_3$ are angular accelerations of the platform base (caused by the vehicle motion) and $i_1$, $j_2$, $k_3$, $i_0$, $j_0$, $k_0$ are the corresponding unit vectors. It can be shown that by projecting all of the acceleration vectors onto the inner gimbal reference frame, and performing some algebraic manipulations, the following relationships are obtained:

$$A_x = f_x(\dot{W}_1, \dot{W}_2, \dot{W}_3) - \ddot{Y}_g \sin(P_g) + \ddot{R}_g$$

$$A_y = f_y(\dot{W}_1, \dot{W}_2, \dot{W}_3) + \ddot{Y}_g \cos(P_g) \sin(R_g) + \ddot{P}_g \cos(R_g) \quad (13)$$

$$A_z = f_z(\dot{W}_1, \dot{W}_2, \dot{W}_3) + \ddot{Y}_g \cos(P_g) \cos(R_g) - \ddot{P}_g \sin(R_g)$$

and $$\underline{A} = A_x \underline{i}_1 + A_y \underline{j}_1 + A_z \underline{k}_1,$$

where $f_x(\dot{W}_1, \dot{W}_2, \dot{W}_3)$, $f_y(\dot{W}_1, \dot{W}_2, \dot{W}_3)$ and $f_z(\dot{W}_1, \dot{W}_2, \dot{W}_3)$ are functions of the vehicle accelerations over which the stabilized imaging device has no control, and where $A_x$, $A_y$ and $A_z$ are the net angular accelerations around the x, y, and z axes, respectively, as shown in FIG. 8.

The values of $A_x$, $A_y$ and $A_z$ are determined by the outputs of the linear accelerometers as in equation (12). If the stabilized imaging device is perfectly stabilized, the net angular acceleration $\underline{A}$ will be null and equations (13) can be set equal to a nominal value, namely, zero. For relatively small angular displacements, i.e. when the sin term is significantly smaller than the cos term, the control strategy to stabilize the stabilized imaging device becomes if $A_x$ is larger than zero, then decrease $\ddot{R}_g$
if $A_x$ is equal to zero, then maintain $\ddot{R}_g$
if $A_x$ is less than zero, then increase $\ddot{R}_g$
if $A_y$ is larger than zero, then decrease $\ddot{P}_g$
if $A_y$ is equal to zero, then maintain $\ddot{P}_g$
if $A_y$ is less than zero, then increase $\ddot{P}_g$
if $A_z$ is larger than zero, then decrease $\ddot{Y}_g$
if $A_z$ is equal to zero, then maintain $\ddot{Y}_g$
if $A_z$ is less than zero, then increase $\ddot{Y}_g$ In a scanning application, zero can be replaced with a predetermined, non-zero nominal value corresponding to the desired scanning angular velocity. Thus, this arrangement uses a very simple control strategy where the accelerometers act as feedback elements of the control loop, thus eliminating the need for an elaborate control system. Therefore, this alternative embodiment has cost advantages, but the penalty is a reduction in performance since the measurement of angular motion with linear accelerometers works best when sensing larger motions with high signal to noise ratios. The small angle limitation can be removed using trigonometric gain compensation in the control loop.

FIG. 9 is a schematic functional representation of the control system for the alternative form of the invention. The control system embodied in FIG. 9 is typically implemented using a microcomputer 170 that performs, in the software, the functions of the roll, pitch and yaw gimbal controllers. The outputs of the accelerometer groups 300, 302, 304, and 306 (attached to the stabilized element) feed into an input module 320 of microcomputer 170 which computes the angular accelerations of the sensing device in roll, pitch, and yaw. These signals feed, respectively, gimbal controllers 330, 332, and 334 as shown in FIG. 9. Roll stabilization is accomplished through the closed loop system actuating servo motor 314 so that the measured net roll angular acceleration of the sensing device is null as described by the control strategy. The measured roll angular acceleration, after being subject to position compensation 340 and velocity compensation 342, is sent to forward loop compensator 344, commanding power amplifier 350, and producing a movement signal which actuates servo motor 314, and rotating roll gimbal 308. The operation of pitch gimbal 310 by controller 332, and yaw gimbal 312 by controller 334, is identical to the operation of roll gimbal 308 by controller 330. As before, the compensators 340, 342, and 344 implement signal compensation according to standard control theory, and reference is again made to the standard texts cited previously.

The linear accelerometers placed on the stabilized element may be replaced by three orthogonal angular accelerometers. These angular accelerometers can be located anywhere on the stabilized element so that they measure roll, pitch and yaw angular accelerations of the stabilized element, and the general operation of the system is as previously described.

CONCLUSION

A preferred and an alternative embodiment of the present invention have been described herein, together with exemplary control strategies for implementation of the invention. It is to be understood that the specific arrangements which have been described are merely illustrative applications of the principles of the present invention. Numerous modifications may be made to apparatus and methods disclosed above without departing from the spirit and scope of the invention, as defined by the appended claims.

What is claimed is:

1. Apparatus for stabilizing an object around at least first and second object axes of rotation with respect to an inertial frame of reference, said object being carried by a vehicle subjected to rotational movement around at least first and second vehicle axes of rotation corresponding to said at least first and second object axes of rotation, said apparatus comprising in combination:
   means for generating vehicle rotation signals corresponding to the rotational movement of said vehicle around at least said first and second vehicle axes of rotation with respect to said inertial frame of reference;
   feedback means for generating feedback signals corresponding to the movement of said object around at least said first and second object axes of rotation independent of said inertial frame of reference;
   control system means responsive to said vehicle rotation signals and responsive to said feedback signals for generating movement signals; and
   movement means responsive to said movement signals for rotatably moving said object around at least said first and second object axes, whereby said object is stabilized around at least said first and second object axes with respect to said frame of reference without the use of a gyroscope as said vehicle undergoes rotation relative to said inertial frame of reference.

2. Apparatus, as claimed in claim 1, wherein said vehicle rotation signals comprise vehicle rotational velocity signals corresponding to the rotational velocities of said vehicle around at least said first and second vehicle axes of rotation.

3. Apparatus, as claimed in claim 2, wherein said means for generating comprises:
   linear accelerometer means carried by said vehicle independent of said object for generating linear acceleration signals corresponding to the linear accelerations of said vehicle; and processor means for calculating said rotational velocity signals in response to said linear acceleration signals.

4. Apparatus, as claimed in claim 1, wherein said vehicle rotation signals comprises vehicle rotational acceleration signals corresponding to the rotational accelerations of said vehicle around at least said first and second vehicle axes of rotation.

5. Apparatus, as claimed in claim 4, wherein said means for generating comprises:
   linear accelerometer means carried by said vehicle independent of said object for generating linear acceleration signals corresponding to the linear accelerations of said vehicle; and
   processor means for calculating said rotational acceleration signals in response to said linear acceleration signals.

6. Apparatus, as claimed in claims 2 or 4, wherein said feedback signals comprise feedback rotational velocity signals corresponding to the rotational velocities of said object around said first and second object axes of rotation.

7. Apparatus, as claimed in claims 2 or 4, wherein said feedback signals comprises feedback rotational position signals corresponding to the rotational positions of said object around said first and second object axes of rotation.

8. Apparatus, as claimed in claim 1, wherein said object is capable of being rotated around first, second and third mutually orthogonal object axes and said vehicle defines first, second and third mutually orthogonal vehicle axes and wherein said movement means comprise:
   first rotating means capable of rotating said object about said first object axis in response to a first one of said movement signals;
   second rotating means capable of rotating said object about said second object axis in response to a second one of said movement signals;
   third rotating means capable of rotating said object about said third object axis in response to a third one of said movement signals.

9. Apparatus, as claimed in claim 8, wherein said movement means comprises a mounting base attached to said vehicle and wherein said first rotating means comprises;
   a first gimbal coupled to said base and capable of rotating about a first gimbal axis corresponding to said third vehicle axis and
   first motor driving means for rotating said first gimbal in response to said first movement signal, wherein the second rotating means comprises:
   a second gimbal coupled to said first gimbal and capable of rotating about a second gimbal axis orthogonal to said first gimbal axis and corresponding to said second vehicle axis, and
   second motor driving means for rotating said second gimbal in response to said second movement signal, wherein the third rotating means comprises:
   a third gimbal coupled to said second gimbal and capable of rotating about a third gimbal axis orthogonal to said second gimbal axis and corresponding to said first vehicle axis, and
   third motor driving means for rotating said third gimbal in response to said third movement signal, and wherein said feedback means comprises:
   a first transducer measuring the angle of rotation of said first gimbal around said first gimbal axis,
   a second transducer measuring the angle of rotation of said second gimbal around said second gimbal axis and
   a third transducer measuring the angle of rotation of said third gimbal around said third gimbal axis, and wherein said control system means is responsive to said vehicle rotation signals and to at least one of said first, second and third transducers for generating said first, second and third movement signals.

10. Apparatus, as claimed in claim 9, wherein said mounting base is passively isolated from said vehicle and said means for generating comprise linear accelerometers attached to said mounting base and arranged in a first group of linear accelerometers positioned at the intersection of three orthogonal base axes defined by said base corresponding to said axes of said vehicle, said first group of linear accelerometers measuring linear accelerations along said three orthogonal base axes, and second, third and fourth groups of linear accelerometers, each second, third and fourth group of linear accelerometers positioned along one of said three orthogonal base axes and measuring linear accelerations along three orthogonal axes.

11. Apparatus, as claimed in claim 9, wherein said mounting base is passively isolated from said vehicle and said means for generating comprise linear accelerometers attached to said mounting base and arranged in a first group of linear accelerometers positioned at the intersection of three orthogonal base axes defined by said base corresponding to said axes of said vehicle, said first group of linear accelerometers measuring linear accelerations along said three orthogonal base axes; and second, third and fourth groups of linear accelerometers, each second, third and fourth group of linear accelerometers positioned along one of said orthogonal axes and measuring linear accelerations along axes parallel to the other two of said three orthogonal base axes.

12. Apparatus, as claimed in claim 9, wherein said mounting base is passively isolated from said vehicle and said means for generating comprise linear accelerometers attached to said mounting base and arranged in a first group of linear accelerometers positioned at the intersection of three orthogonal base axes defined by said base corresponding to said axes of said vehicle and measuring linear accelerations along first and second of said base axes corresponding to axes of said vehicle, a second group of linear accelerometers positioned along a third of said base axes corresponding to an axis of said vehicle and measuring linear accelerations along axes parallel to said first and second base axes, and a third linear accelerometer positioned along one of said base axes containing said first group of linear accelerometers and measuring linear accelerations along an axis corresponding to an axis of said vehicle and parallel to one of said first and second base axes.

13. Apparatus, as claimed in claim 9, wherein said third movement signal is responsive to a third, setpoint signal $G_3$, corresponding to the desired angular velocity of said object around said third gimbal axis and proportional to $$(-W_1 - W_2 \tan G_1)/(\cos G_2 \cos G_1 + \tan G_1 \cos G_2 \sin G_1),$$

wherein said second movement signal is responsive to a second setpoint signal corresponding to the desired angular velocity of said object around said second gimbal axis and proportional to $$(-W_2-G_3 \cos G_2 \sin G_1)/(\cos G_1),$$

and wherein said first movement signal is responsive to a first setpoint signal corresponding to the desired angular velocity of said object around said first gimbal axis and proportional to $$(-W_3+G_3 \sin G_2)$$

where $W_1$, $W_2$ and $W_3$ correspond to the angular velocities of said vehicle around said first, second and third vehicle axes, respectively and where $G_1$ and $G_2$ are the angles of rotation around said first and second gimbal axes, respectively.

14. Apparatus, as claimed in claim 9, wherein said apparatus is operated in a scanning mode and wherein said third movement signal is responsive to a third setpoint signal, $G_3$, corresponding to the desired angular velocity of said object around said third gimbal axis and proportional to $$(-W_1-W_2 \tan G_1)/(\cos G_2 \cos G_1 + \tan G_1 \cos G_2 \sin G_1)$$

wherein said second movement signal is responsive to a second setpoint signal corresponding to the desired angular velocity of said object around said second gimbal axis and proportional to $$(-W_2-G_3 \cos G_2 \sin G_1)/(\cos G_1),$$

and wherein said first movement signal is responsive to a first setpoint signal corresponding to the desired angular velocity of said object around said first gimbal axis and proportional to $$(-W_3+G_3 \sin G_2)$$

where $W_1$, $W_2$ and $W_3$ correspond to the difference between the base angular velocities in roll, pitch, and yaw, respectively and the desired angular scanning velocities of said object and where $G_1$ and $G_2$ are the angles of rotation around said first and second gimbal axes, respectively.

15. Apparatus, as claimed in claim 9, wherein said third movement signal is responsive to a third setpoint signal, $G_3$, corresponding to the desired angular acceleration of said object around said third gimbal axis and proportional to $$(-\dot{W}_1-\dot{W}_2 \tan G_1)/(\cos G_2 \cos G_1 + \tan G_1 \cos G_2 \sin G_1),$$

wherein said second movement signal is responsive to a second setpoint signal corresponding to the desired angular acceleration of said object around said second gimbal axis and proportional to $$(-\dot{W}_2-G_3 \cos G_2 \sin G_1)/(\cos G_1),$$

and wherein said first movement signal is responsive to a setpoint signal corresponding to the desired angular acceleration of said object around said first gimbal axis and proportional to $$(-\dot{W}_3+G_3 \sin G_2)$$

where $\dot{W}_1$, $\dot{W}_2$ and $\dot{W}_3$ correspond to the angular accelerations of said vehicle around said first, second and third vehicle axes, respectively and where $G_1$ and $G_2$ are the angles of rotation around said first and second gimbal axes, respectively.

16. Apparatus, as claimed in claim 9, wherein said apparatus is operated in a scanning mode and wherein said third movement signal is responsive to a third setpoint signal, $G_3$, corresponding to the desired angular acceleration of said object around said third gimbal axis and proportional to $$(-\dot{W}_1-\dot{W}_2 \tan G_1)/(\cos G_2 \cos G_1 + \tan G_1 \cos G_2 \sin G_1),$$

wherein said second movement signal is responsive to a second setpoint signal corresponding to the desired angular acceleration of said object around said second gimbal axis and proportional to $$(-\dot{W}_2-G_3 \cos G_2 \sin G_1)/(\cos G_1),$$

and wherein said first movement signal is responsive to a first setpoint signal corresponding to the desired angular acceleration of said object around said first gimbal axis and proportional to $$(-\dot{W}_3+G_3 \sin G_2)$$

where $\dot{W}_1$, $\dot{W}_2$ and $\dot{W}_3$ correspond to the differences between the base angular accelerations in roll, pitch, and yaw, respectively and the desired angular scanning accelerations of said object and where $G_1$ and $G_2$ are the angles of rotation around said first and second gimbal axes, respectively.

17. A method for stabilizing an object around at least first and second object axes of rotation with respect to an inertial frame of reference, said object being carried by a vehicle subjected to rotational movement around at least first and second vehicle axes of rotation corresponding to said at least first and second object axes of rotation, said method comprising the steps of:
  generating vehicle rotation signals corresponding to the rotational movement of said vehicle around at least said first and second vehicle axes of rotation with respect to said inertial frame of reference;
  generating feedback signals corresponding to the movement of said object around at least said first and second object axes of rotation independent of said inertial frame of reference;
  generating movement signals responsive to said one or more vehicle rotation signals and responsive to said feedback signals; and
  rotatably moving said object around at least said first and second object axes responsive to said movement signals, whereby said object is stabilized around at least said first and second object axes with respect to said inertial frame of reference without the use of a gyroscope as said vehicle undergoes rotation relative to said inertial frame of reference.

18. A method, as claimed in claim 17, wherein said vehicle rotation signals comprise vehicle rotational velocity signals corresponding to the rotational velocities of said vehicle around at least said first and second vehicle axes of rotation.

19. A method, as claimed in claim 18, wherein said steps of generating comprises the steps of:
  generating linear acceleration signals corresponding to the linear accelerations of said vehicle; and calculating said rotational velocity signals in response to said linear acceleration signals.

20. A method, as claimed in claim 17, wherein said vehicle rotation signals comprises vehicle rotational acceleration signals corresponding to the rotational accelerations of said vehicle around at least said first and second vehicle axes of rotation.

21. A method, as claimed in claim 20, wherein the step of generating comprises the steps of:
generating linear acceleration signals corresponding to the linear accelerations of said vehicle; and
calculating said rotational acceleration signals in response to said linear acceleration signals.

22. A method, as claimed in claims 18 or 20, wherein the feedback signals comprise feedback rotation velocity signals corresponding to the rotational velocities of said object around at least said first and second object axes of rotation.

23. A method, as claimed in claims 18 or 20, wherein the feedback signals comprises feedback rotational position signals corresponding to the rotational positions of said object around at least said first and second object axes of rotation.

24. A method, as claimed in claim 17, wherein said vehicle axes of rotation are orthogonal vehicle axes of rotation, wherein said object is moved relative to said vehicle by rotation around first, second and third orthogonal object axes of rotation and said movement signals comprise first, second and third movement signals for rotation around said first, second and third orthogonal object axes of rotation, respectively, and wherein said third movement signal is responsive to a third setpoint signal, $S_3$ proportional to $$(-\dot{W}_1 - \dot{W}_2 \tan Y)/(\cos P \cos Y + \tan Y \cos P \sin Y),$$

said second movement signal is responsive to a second setpoint signal proportional to $$(-\dot{W}_2 - S_3 \cos P \sin Y)/\cos Y$$

and said first movement signal is responsive to a first setpoint signal proportional to $$-\dot{W}_3 + S_3 \sin P,$$

wherein $\dot{W}_1$, $\dot{W}_2$ and $\dot{W}_3$ are the measurements of the angular accelerations of said vehicle around said orthogonal vehicle axes of rotation and Y and P are the angles of rotation around said first and second object axes of rotation.

25. A method, as claimed in claim 17, wherein said vehicle axes of rotation comprise orthogonal vehicle axes of rotation, wherein said object is moved in a scanning mode relative to said vehicle by rotation around first, second and third orthogonal object axes of rotation and said movement signals comprise first, second and third movement signals for rotation around said first, second and third orthogonal object axes of rotation, respectively, and wherein said third movement signal is responsive to a third setpoint signal, $S_3$, proportional to $$(-\dot{W}_1 - \dot{W}_2 \tan Y)/(\cos P \cos Y + \tan Y \cos P \sin Y),$$

said second movement is responsive to a second setpoint signal proportional to $$(-\dot{W}_2 - S_3 \cos P \sin Y)/\cos Y,$$

and said first movement signal is responsive to a first setpoint signal proportional to $$-\dot{W}_3 + S_3 \sin P,$$

wherein $\dot{W}_1$, $\dot{W}_2$ and $\dot{W}_3$ correspond to the differences between the measurements of the angular accelerations of said vehicle around said orthogonal vehicle axes of rotation and the desired angular scanning accelerations of said object, and Y and P are the angles of rotation around said first and second object axes of rotation.

26. A method, as claimed in claim 17, wherein said vehicle axes of rotation are orthogonal vehicle axes of rotation, wherein said object is moved relative to said vehicle by rotation around first, second and third orthogonal object axes of rotation and said movement signals comprise first, second, and third movement signals for rotation around said first, second, and third orthogonal object axes of rotation, respectively, and wherein said third movement signal is responsive to a third setpoint signal, $S_3$ proportional to $$(-W_1 - W_2 \tan Y)/(\cos P \cos Y + \tan Y \cos P \sin Y),$$

said second movement signal is responsive to a second setpoint signal proportional to $$(-W_2 - S_3 \cos P \sin Y)/\cos Y,$$

and said first movement signal is responsive to a first setpoint signal proportional to $$-W_3 + S_3 \sin P,$$

wherein $W_1$, $W_2$ and $W_3$ are the measurements of the angular velocities of said vehicle around said orthogonal vehicle axes of rotation and Y and P are the angles of rotation around said first and second object axes of rotation.

27. A method, as claimed in claim 17, wherein said vehicle axes of rotation comprise orthogonal vehicle axes of rotation, wherein said object is moved in a scanning mode relative to said vehicle by rotation around first, second and third orthogonal object axes of rotation and said movement signals comprise first, second, and third movement signals for rotation around said first, second, and third orthogonal object axes of rotation, respectively, and wherein said third movement signal is responsive to a third setpoint signal, $S_3$ proportional to $$(-W_1 - W_2 \tan Y)/(\cos P \cos Y + \tan Y \cos P \sin Y),$$

said second movement signal is responsive to a second setpoint signal proportional to $$(-W_2 - S_3 \cos P \sin Y)/\cos Y,$$

and said first movement signal is responsive to a first setpoint signal proportional to $$-W_3 + S_3 \sin P,$$

wherein $W_1$, $W_2$ and $W_3$ correspond to the differences between the measurements of the angular velocities of said vehicle around said orthogonal vehicle axes of rotation and the desired angular scanning velocities of said object, and Y and P are the angles of rotation around said first and second object axes of rotation.

28. Apparatus for stabilizing an object capable of being rotated in three degrees of freedom with respect to an inertial frame of reference, said object being carried in a vehicle subject to rotational movement around first, second and third vehicle axes of rotation with respect to said inertial frame of reference, said object defining three object axes corresponding to said first, second and third vehicle axes of rotation, said apparatus comprising in combination:

linear accelerometer means carried by said object for measuring the net linear accelerations of said object and said vehicle in said three degrees of freedom;

processor means for calculating the net angular accelerations of said object and said vehicle in said three degrees of freedom in response to said linear accelerometer means;

control system means responsive to said calculating of said net angular accelerations by said processor means for generating movement signals; and movement means responsive to said movement signals for rotatably moving said object in said three degrees of freedom, whereby said object is stabilized in said three degrees of freedom with respect to said inertial frame of reference without the use of a gyroscope as said vehicle undergoes rotation relative to said inertial frame of reference.

29. Apparatus, as claimed in claim 28, and further comprising feedback means for generating feedback signals corresponding to the movement of said object with respect to said object coordinate axes in said three degrees of freedom wherein said control system means is responsive to said processor means and said feedback signals for generating said movement signals.

30. Apparatus, as claimed in claim 29, wherein said feedback signals comprise feedback rotational velocity signals corresponding to the rotational velocities of said object with respect to said object coordinate axes in said three degrees of freedom.

31. Apparatus, as claimed in claim 29, wherein said feedback signals comprise feedback rotational position signals corresponding to the rotational position of said object with respect to said object coordinate axes in said three degrees of freedom.

32. Apparatus, as claimed in claim 28, wherein said object coordinate axes comprise roll, pitch and yaw axes, wherein said object is rotatable around said roll, pitch and yaw axes, wherein the means for calculating comprises means for calculating the net angular accelerations of said object and said vehicle around said roll, pitch and yaw axes, and wherein the control system means comprises means for generating movement signals such that the net angular accelerations of said object and said vehicle around said roll, pitch and yaw axes are urged toward respective nominal values.

33. Apparatus, as claimed in claim 32, wherein said movement means comprises:

means for maintaining, increasing or decreasing the acceleration of said object around said roll axis depending on whether the means for calculating indicates that the net acceleration of said object and said vehicle around said roll axis is equal to, less than or greater than, respectively, said nominal value;

means for maintaining, increasing or decreasing the acceleration of said object around said pitch axis depending on whether the means for calculating indicates that the net acceleration of said object and said vehicle around said pitch axis is equal to, less than or greater than, respectively, said nominal value; and means for maintaining, increasing or decreasing the acceleration of said object around said yaw axis depending on whether the means for calculating indicates that the net acceleration of said object and said vehicle around said yaw axis is equal to, less than or greater than, respectively, said nominal value.

34. Apparatus, as claimed in claim 28, wherein said object axes are orthogonal object axes, wherein said linear accelerometer means comprises linear accelerometers attached to said object and arranged in a first group of linear accelerometers positioned at the intersection of said three orthogonal object axes, said first group of linear accelerometers measuring linear accelerations along axes parallel to said three orthogonal object axes, and second, third, and fourth groups of linear accelerometers, each second, third and fourth groups of linear accelerometers positioned along one of said three orthogonal object axes and measuring linear accelerations along said three orthogonal object axes.

35. Apparatus, as claimed in claim 28, wherein said object axes are orthogonal object axes, wherein said linear accelerometer means comprises linear accelerometers attached to said object and arranged in a first group of linear accelerometers positioned at the intersection of said three orthogonal object axes, said first group of linear accelerometers measuring linear accelerations along said three orthogonal object axes, and second, third, and fourth groups of linear accelerometers, each second, third and fourth groups of linear accelerometers positioned along one of said three orthogonal object axes and measuring linear accelerations along axes parallel to the other two of said three orthogonal object axes.

36. Apparatus, as claimed in claim 28, wherein said object axes are orthogonal object axes, wherein said linear accelerometer means comprises linear accelerometers attached to said object and arranged in a first group of linear accelerometers positioned at the intersection of said three orthogonal object axes, said first group of linear accelerometers measuring linear accelerations along first and second object axes of said orthogonal object axes; a second group of linear accelerometers positioned along a third object axis of said object axes and measuring linear acceleration along axes parallel to said first and second object axes, and a third linear accelerometer positioned along an object axis containing said first group of linear accelerometers and measuring linear accelerations parallel to one of said first and second axes of said orthogonal object axes.

37. A method of stabilizing an object capable of being rotated in three degrees of freedom with respect to an inertial frame of reference, said object being carried in a vehicle subject to rotational movement around first, second and third vehicle axes of rotation with respect to said inertial frame of reference, said object defining three object axes corresponding to said first, second and third vehicle axes of rotation, said method comprising the steps of:

measuring the net linear accelerations of said object and said vehicle in said three degrees of freedom;

calculating the net angular accelerations of said object and said vehicle in said three degrees of freedom in response to said measurement of net linear accelerations;

generating movement signals responsive to said calculating of said net angular accelerations; and rotatably moving said object in said three degrees of freedom responsive to said movement signals, whereby said object is stabilized in said three degrees of freedom with respect to said inertial frame of reference without the use of a gyroscope as said vehicle undergoes rotation relative to said inertial frame of reference.

38. A method, as claimed in claim 37, and further comprising the steps of:

generating feedback signals corresponding to the movement of said object with respect to said object axes in said three degrees of freedom; and generating said movement signals responsive to said angular acceleration and said feedback signals.

39. A method, as claimed in claim 38, wherein said feedback signals comprise feedback rotational velocity signals corresponding to the rotational velocities of said object with respect to said object axes in said three degrees of freedom.

40. A method, as claimed in claim 38, wherein said feedback signals comprise feedback rotational position signals corresponding to the rotational positions of said object with respect to said object axes in said three degrees of freedom.

41. A method, as claimed in claim 37, wherein said object axes comprise roll, pitch and yaw axes, wherein said object is rotatable around said roll, pitch and yaw axes, wherein the step of calculating comprises the step of calculating the net angular accelerations of said object and said vehicle around said roll, pitch and yaw axes, and wherein the step of generating comprises the step of generating movement signals such that the net angular accelerations of said object and said vehicle around said roll, pitch and yaw axes are urged toward respective nominal values.

42. A method, as claimed in claim 41, wherein said step of rotatably moving comprises the steps of:

maintaining, increasing or decreasing the acceleration of said object around said roll axis depending on whether the step of calculating indicates that the net acceleration of said object and said vehicle around said roll axis is equal to, less than or greater than, respectively, said nominal value;

maintaining, increasing or decreasing the acceleration of said object around said pitch axis depending on whether the step of calculating indicates that the net acceleration of said object and said vehicle around said pitch axis is equal to, less than or greater than, respectively, said nominal value; and maintaining, increasing or decreasing the acceleration of said object around said yaw axis depending on whether the step of calculating indicates that the net acceleration of said object and said vehicle around said yaw axis is equal to, less than or greater than, respectively, said nominal value.

* * * * *